US009841340B1

(12) United States Patent
Harthan et al.

(10) Patent No.: US 9,841,340 B1
(45) Date of Patent: Dec. 12, 2017

(54) PRESSURE MEASUREMENT APPARATUS, ASSEMBLIES AND METHODS

(71) Applicant: Scanivalve Corporation, Liberty Lake, WA (US)

(72) Inventors: Christopher John Harthan, Spokane Valley, WA (US); Blair Randall Chalpin, Spokane Valley, WA (US)

(73) Assignee: Scanivalve Corporation, Liberty Lake, WA (US)

( * ) Notice: Subject to any disclaimer, the term of this patent is extended or adjusted under 35 U.S.C. 154(b) by 210 days.

(21) Appl. No.: 14/737,371

(22) Filed: Jun. 11, 2015

Related U.S. Application Data

(60) Provisional application No. 62/130,474, filed on Mar. 9, 2015.

(51) Int. Cl.
| | | |
|---|---|---|
| *G01L 9/00* | (2006.01) | |
| *G01L 19/00* | (2006.01) | |
| *G01L 15/00* | (2006.01) | |
| *G01L 9/08* | (2006.01) | |

(52) U.S. Cl.
CPC ............ *G01L 9/08* (2013.01); *G01L 19/0038* (2013.01)

(58) Field of Classification Search
CPC ... G01L 15/00; G01L 9/00; G01L 9/08; G01L 19/00; G01L 19/0038
See application file for complete search history.

(56) References Cited

U.S. PATENT DOCUMENTS 6,401,543 B1 * 6/2002 Raccio ............... G01L 19/0015
73/753

FOREIGN PATENT DOCUMENTS

EP 1146327 A2 * 10/2001 ......... G01L 19/0015

OTHER PUBLICATIONS

Dow Corning, "3145 RTV MIL-A-46146 Adhesive Sealant—Clear", Product Information, Electronics, Dec. 7, 2012, United States, 3 pages.
O'Grady, "Transducer/Sensor Excitation and Measurement Techniques", Analog Dialogue vol. 34 No. 5, 2000, published online at http://www.analog.com/library/analogDialogue/archives/34-05/sensor/index.html, 6 pages.
Pemberton et al., U.S. Appl. No. 62/130,474, filed Mar. 9, 2015, titled "Pressure Scanning Apparatus and Methods", 25 pages.

* cited by examiner

*Primary Examiner* — Nguyen Ha
(74) *Attorney, Agent, or Firm* — Wells St. John P.S.

(57) ABSTRACT

Pressure measurement apparatus, assemblies and methods are described. According to one aspect, a pressure sensor assembly includes a substrate, a first adhesive member adhered to the substrate, a sensor support adhered to the first adhesive member, a second adhesive member adhered to the sensor support, and a pressure sensor adhered to the second adhesive member and aligned with apertures of the substrate, first adhesive member, and second adhesive member, and the pressure sensor is configured to vary an output signal as a result of changes in pressure of a received air stream, and the output signal is indicative of the changes in pressure of the air stream.

20 Claims, 25 Drawing Sheets

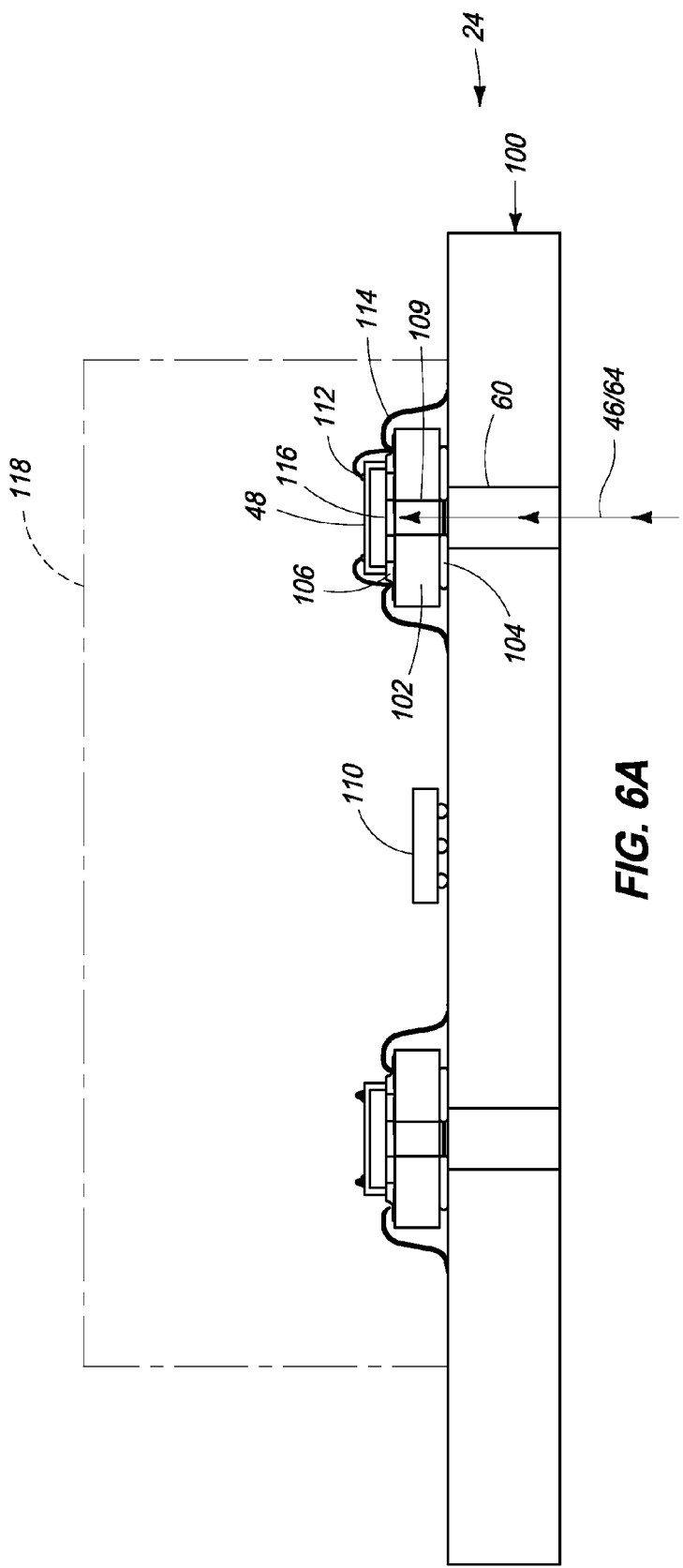

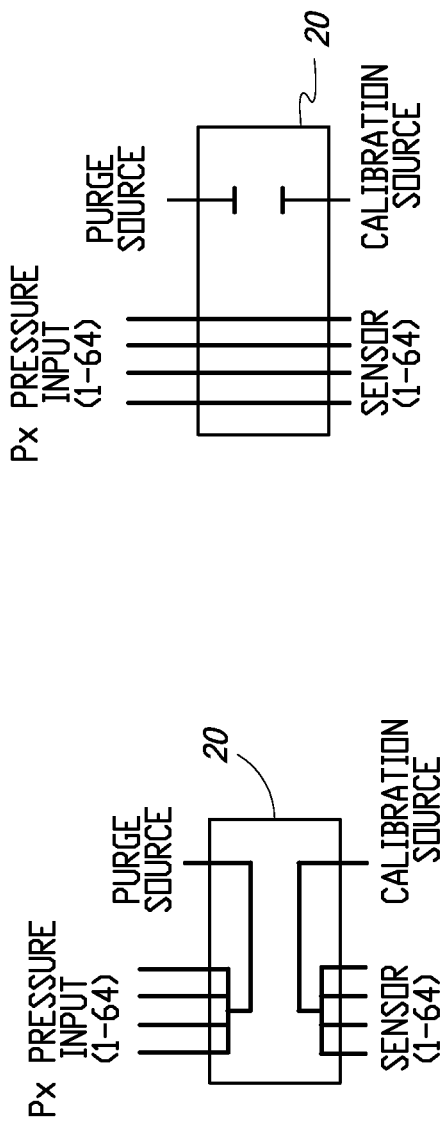

PRESSURE MEASUREMENT APPARATUS, ASSEMBLIES AND METHODS

RELATED PATENT DATA

This application claims priority to U.S. Provisional Patent Application Ser. No. 62/130,474, which was filed on Mar. 9, 2015, entitled "Pressure Scanning Apparatus and Methods," the disclosure of which is incorporated herein by reference.

TECHNICAL FIELD

At least some embodiments of the disclosure relate to pressure measurement apparatuses, assemblies, and associated methods for measuring pressures of one or more air streams.

BACKGROUND OF THE DISCLOSURE

Some of the embodiments described below are directed towards apparatus, assemblies and methods which scan and measure a plurality of different input air streams. Pressure measurement apparatus, assemblies and methods of the present disclosure may be used in various applications to provide pressure monitoring. In one more specific example, the disclosed apparatus and methods may be used to measure pressures of a plurality of air streams originating from a plurality of different points of a vehicle (automobile, plane, etc.) being tested within a wind tunnel.

BRIEF DESCRIPTION OF THE DRAWINGS

Example embodiments of the disclosure are described below with reference to the following accompanying drawings.

FIG. 6A is a cross-sectional view of a sensor assembly according to one embodiment.

FIG. 7 is a map showing how FIGS. 7A-7C illustrate a schematic drawing of circuitry of a pressure measurement apparatus according to one embodiment.

FIGS. 17A-B are illustrative representations of a valve assembly according to one embodiment.

DETAILED DESCRIPTION OF THE DISCLOSURE

Example embodiments of this disclosure relate to pressure measurement apparatuses, assemblies and associated methods for measuring pressures of one or more air streams. As described below, some example embodiments of the disclosure provide pressure measurement apparatuses which may scan and measure a plurality of input air streams on a plurality of channels. At least one embodiment provides apparatus and methods which provide high speed data acquisition enabling a large number of pressures to be accurately monitored. A plurality of features of the apparatus and methods for measuring pressures are described below according to plurality of example embodiments. Different embodiments of the pressure measurement apparatus and methods may embody or utilize one or more of the different features described below and different combinations of the described features.

As described in detail below, some embodiments of the pressure measurement apparatuses of the present disclosure selectively operate in two modes of operation including a measurement mode where air pressures may be measured for one or more input air streams, and a service mode where servicing operations of the apparatus are performed (e.g., calibration and/or purging operations discussed in further detail below).

Air is understood to mean any fluid in gas form in the present application and includes but is not limited to ambient air in the environment of the pressure sensing apparatus, air within a wind tunnel, pressurized sources of gases, etc.

Figure 1:
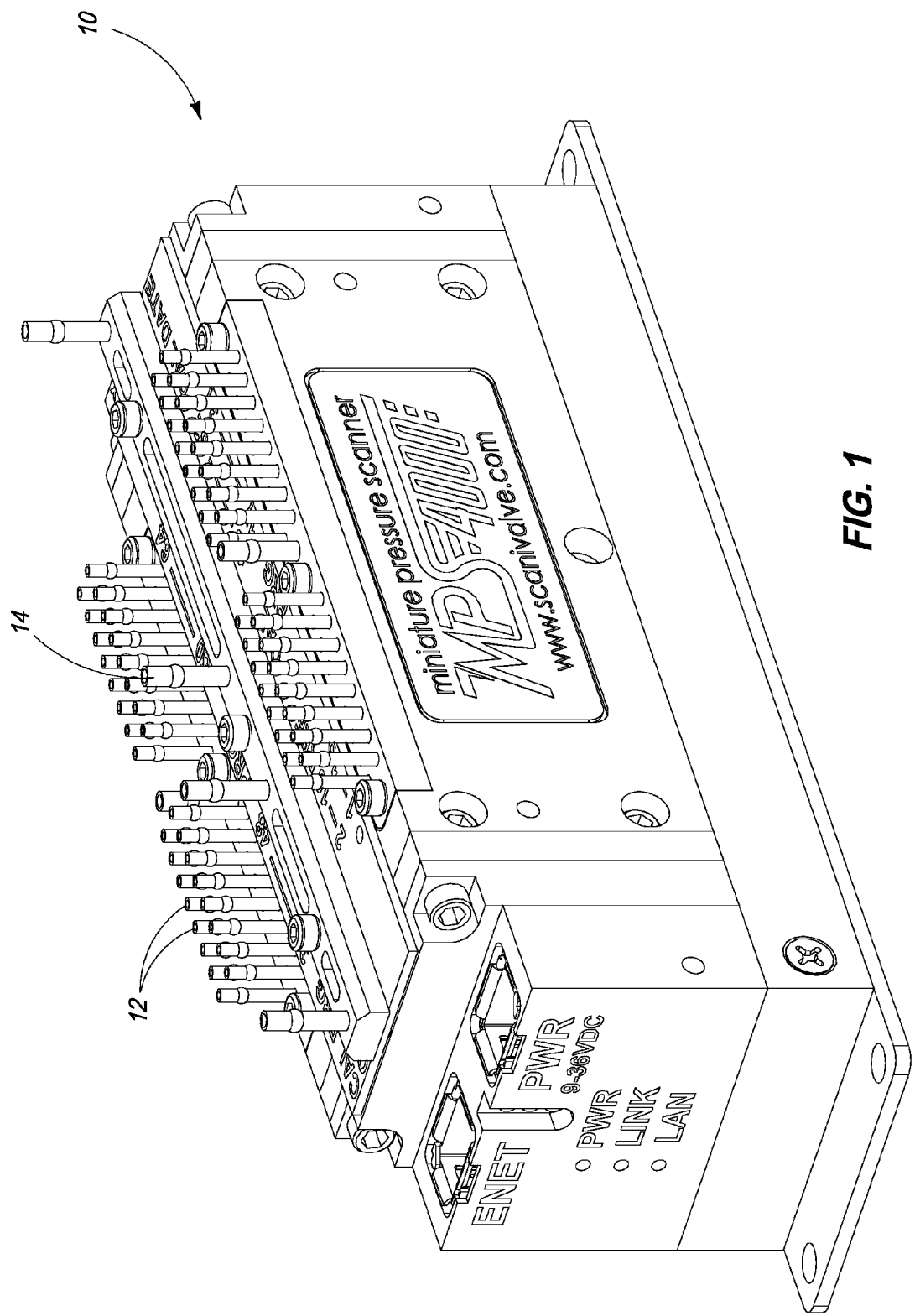
FIG. 1 is an isometric view of a pressure measurement apparatus according to one embodiment.

Referring to FIG. 1, one embodiment of a pressure measurement apparatus 10 is shown in the form of an assembled module. The illustrated apparatus 10 is arranged to scan and measure a plurality of input air streams which are received via appropriate tubing (not shown) within a plurality of respective air inlets 12 which may be stainless steel tubes having interior diameters of 0.031" or 0.040" in one embodiment. The apparatus 10 also includes one or more purge inlets 14 which may be coupled with a source of purge air for purging operations.

Figure 1A:
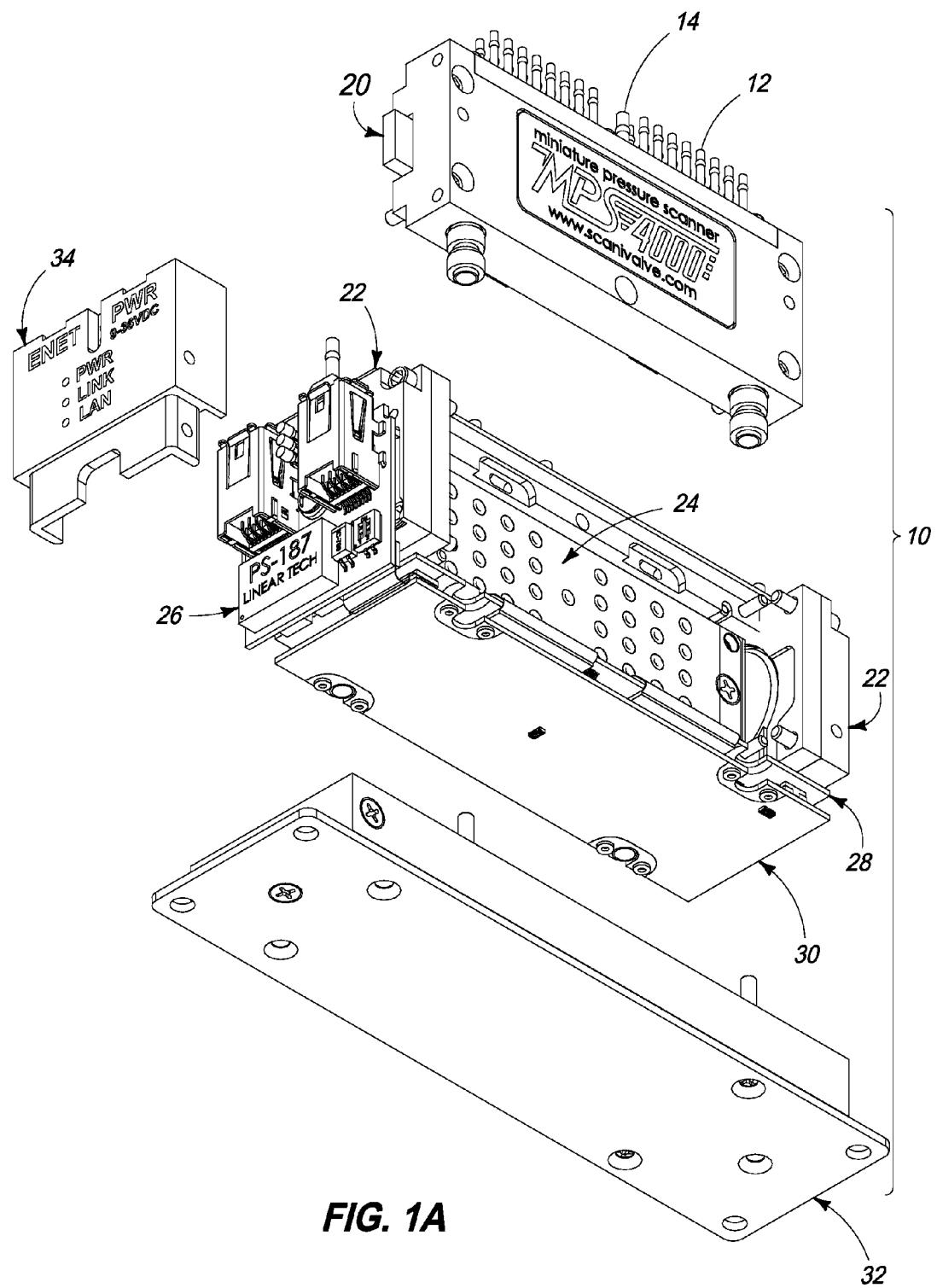
FIG. 1A is an exploded view of a pressure measurement apparatus according to one embodiment.

Referring to FIG. 1A, an exploded view of the module of FIG. 1 is shown. The illustrated embodiment of the apparatus 10 includes a plurality of valve assemblies 20 (only one of the assemblies 20 is visible in FIG. 1A with the other assembly residing behind the illustrated sensor assembly 24 discussed below with respect to an example embodiment of FIGS. 6 and 6A).

The apparatus of FIG. 1A also includes a plurality of valve actuators 22, sensor assemblies 24, power and communications circuitry 26, analog-to-digital (A/D) circuitry 28, processing circuitry 30, a lower cover 32 and an end cover 34. The embodiment of apparatus 10 shown in FIGS. 1 and 1A is but one example and other configurations are possible.

The valve assemblies 20 selectively provide the apparatus 10 in the measurement and service modes of operation and control the flow of the air streams during the operation of the apparatus 10 in the different modes of operation as discussed in detail below.

Valve actuators 22 individually operate to move a valve shuttle of one of the valve assemblies 20 between plural positions to provide the apparatus 10 in the different measurement and service modes of operation.

Sensor assemblies 24 each include a plurality of pressure sensors (not shown in FIG. 1A) which are each configured to measure the pressure of an air stream. Only one sensor assembly 24 is shown in FIG. 1A, with the other assembly residing behind the illustrated assembly 24.

Power and communications circuitry 26 is configured to provide operational electrical energy of appropriate voltages to the various components of the apparatus 10 as well as implement communication operations internally of apparatus 10 and with respect to devices which are external of apparatus 10. For example, communications circuitry 26 may communicate information bi-directionally with respect to apparatus 10 and include hardware for wired connections (e.g., Ethernet interface, network interface card (NIC), serial or parallel connections, USB port, Firewire interface), and/or circuitry for wireless connections (e.g., Bluetooth, Cellular, WiFi, etc.).

A/D circuitry 28 is configured to convert received analog voltages from the pressure sensors into digital values. In addition, A/D circuitry 28 may also implement multiplexing and amplifying operations as described example embodiments below.

Processing circuitry 30 is arranged to process data, control data access and storage, control the mode of operation of apparatus 10, control pressure sensing operations and data acquisition, perform engineering unit conversions, issue commands, and control other desired operations of apparatus 10.

Processing circuitry 30 may comprise circuitry configured to implement desired programming provided by appropriate computer-readable storage media in at least one embodiment. For example, the processing circuitry 30 may be implemented as one or more processor(s) and/or other structure configured to execute executable instructions including, for example, software and/or firmware instructions. Other example embodiments of processing circuitry 30 include hardware logic, PGA, FPGA, ASIC, state machines, and/or other structures alone or in combination with one or more processor(s). These examples of processing circuitry 30 are for illustration and other configurations are possible.

Processing circuitry 30 may also include storage circuitry configured to store programming such as executable code or instructions (e.g., software and/or firmware), electronic data, databases, or other digital information. At least some embodiments or aspects described herein may be implemented using programming stored within one or more computer-readable storage medium of the storage circuitry and configured to control processing circuitry 30.

The computer-readable storage medium may be embodied in one or more articles of manufacture which can contain, store, or maintain programming, data and/or digital information for use by or in connection with an instruction execution system including processing circuitry 30 in one embodiment. For example, computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Figure 2:
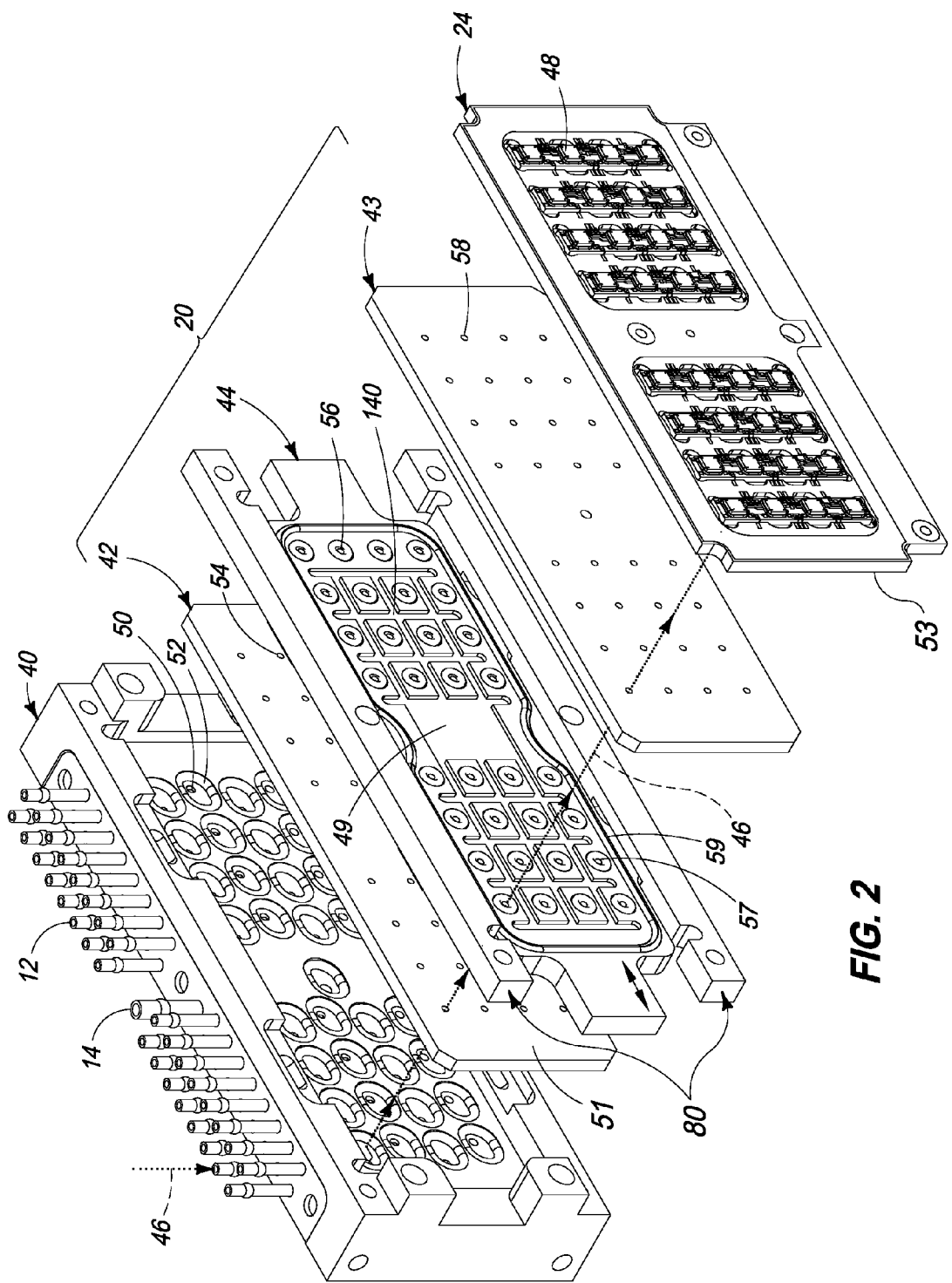
FIG. 2 is an exploded view of a sensor assembly and a valve assembly during a measurement mode of operation according to one embodiment.
Figure 2A:
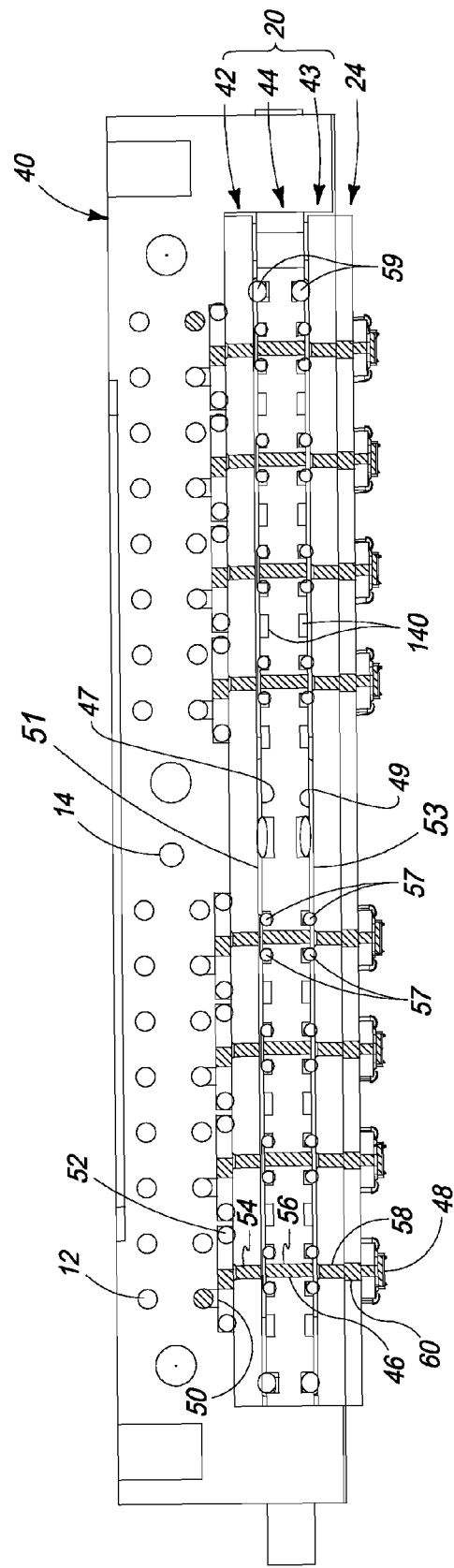
FIG. 2A is a cross-sectional view of a sensor assembly and a valve assembly during a measurement mode of operation according to one embodiment.
Figure 3:
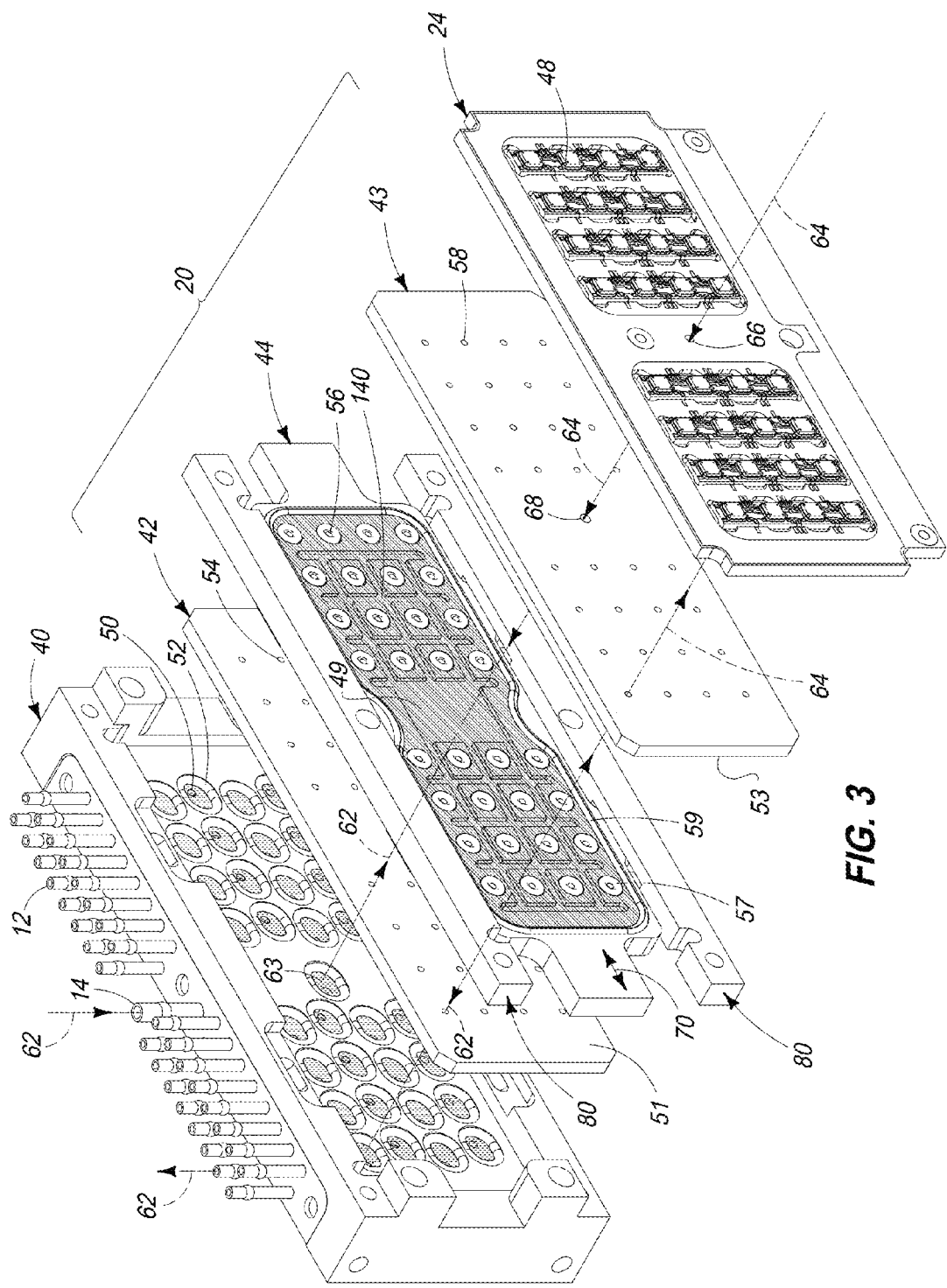
FIG. 3 is an exploded view of a sensor assembly and a valve assembly during a service mode of operation according to one embodiment.
Figure 3A:
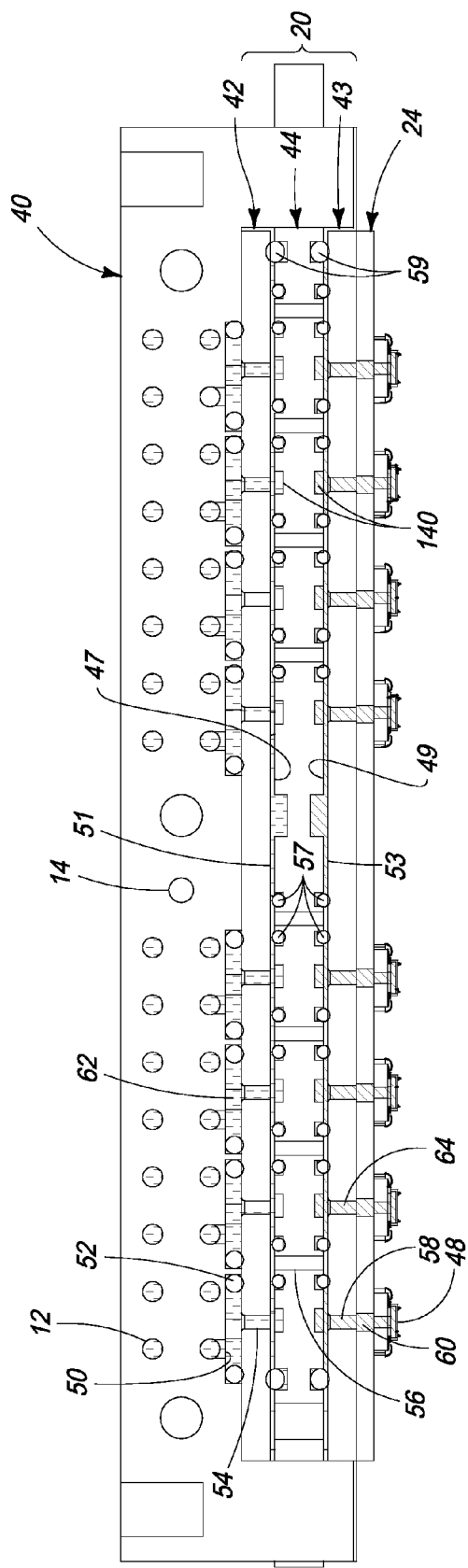
FIG. 3A is a cross-sectional view of a sensor assembly and a valve assembly during a service mode of operation according to one embodiment.

Referring to FIGS. 2, 2A, 3 and 3A, details of one embodiment of one of the valve assemblies 20 of apparatus 10 are described. The valve assemblies 20 control the flow of air streams within apparatus 10 and enable different modes of operation of the apparatus 10. In some example embodiments, each valve assembly 20 switches operation between the measurement mode of operation (FIGS. 2 and 2A) and service mode of operation (FIGS. 3 and 3A).

The pressures of the air streams to be monitored are introduced through a plurality of respective ports or inlets 12 discussed above and routed through the valve assemblies 20 to respective pressure sensors during the measurement operational mode. In the default measurement operational mode, a plurality of discrete paths are provided through the apparatus 10 for the input air streams (also referred to as channels) received by the inlets 12 to respective ones of a plurality of pressure sensors which measure the pressures of the air streams.

In one embodiment, when operation is switched to the service operational mode, the valve assemblies 20 shut the discrete paths between the air inlets 12 and the pressure sensors. Further, in one embodiment described further below, the inlets 12 are manifolded together and are common to purge port 14 where a source of purge air can be used to 'purge' all of the air inlets 12 outward simultaneously by providing a reverse pressure (back flow) to each air inlet 12 which dislodges foreign debris (moisture, dust, oil particulate, etc.) from air inlets 12 and input tubing coupled therewith.

In addition, in one embodiment, the inputs of the pressure sensors are manifolded together during the service mode of operation and a source of calibration air at a known pressure may be applied via a calibration port to the pressure sensors for validation or calibration tasks of the pressure sensors. Additional details of one embodiment of valve assembly 20 and operation in the measurement and service modes of operation are discussed below.

The example illustrated embodiment of the valve assembly 20 is a shuttle/slider design and is actuated between one of two positions using any appropriate actuator arrangement (e.g., pneumatically by an inflated diaphragm, spring force, electrical actuation, etc.). As discussed below, a valve shuttle 44 slides linearly between two parallel bearing members 42, 43 in the described embodiment. Paths for the air streams passing through the valve shuttle 44 are sealed by dynamic sealing members 57 that align concentrically over pressure ports 56 of the valve shuttle 44 and individually operate to form a seal about one of the inputs or outputs of the valve assembly 20 in one embodiment. Valve shuttle 44 is configured to move between plural positions corresponding to the measurement and service modes of operation and which selectively provides (i.e., during operation in the measurement mode of operation) air streams received via a plurality of inputs of the valve assembly 20 to a plurality of respective outputs of the valve assembly 20.

Referring initially to FIGS. 2 and 2A, operations with respect to the measurement operational mode of apparatus 10 are discussed. The illustrated valve assembly 20 includes first and second bearing members 42, 43, and valve shuttle 44 intermediate the bearing members 42. The valve assembly 20 is intermediate an inner support member 40 and plural outer support members 80 of a support assembly and a sensor assembly 24 is positioned adjacent to bearing member 43 in the depicted embodiment.

Input air streams 46 received via inlets 12 are passed through the valve assembly 20 to respective ones of a plurality of pressure sensors or transducers 48 during operation in the measurement mode. In particular, inner support member 40 includes a plurality of apertures 50 which are in fluid communication with respective air inlets 12 and receive the air streams from air inlets 12. Additionally, apertures 50 are also in fluid communication with a plurality of respective apertures 54 of first bearing member 42 and a plurality of static sealing members, such as static O-rings 52, form a seal about apertures 50, 54. The pressure sensors 48 measure pressures of respective ones of the air streams 46 which are received. Apertures 50 of the first bearing member 42 may also be referred to as inputs or input ports of the valve assembly 20.

In one embodiment, the valve shuttle 44 is 2024-T3 aluminum which moves between first and second positions during operations of the apparatus 10 in the measurement and calibration modes of operation. Valve shuttle 44 includes a plurality of air passages or ports 56 which pass between the opposing surfaces of valve shuttle 44 which are adjacent to first and second bearing members 42, 43.

Air passages 56 are provided in fluid communication with respective apertures 54 of first bearing member 42 and a plurality of apertures 58 of second bearing member 43 when valve shuttle 44 is provided in the first position corresponding to the measurement mode of operation of apparatus 10. Apertures 58 of the second bearing member 43 may also be referred to as outputs or output ports of the valve assembly 20.

A plurality of dynamic sealing members 57 form seals between apertures 54 and air passages 56 as well as between air passages 56 and apertures 58 when valve shuttle 44 is positioned in the first position shown in FIGS. 2 and 2A.

Air passages 56 of the valve shuttle 44 provide the apertures 50 operating as inputs of the valve assembly 20 in fluid communication with the apertures 58 operating as outputs of the valve assembly 20 when the valve shuttle 44 is provided in the first position corresponding to the measurement mode of operation of apparatus 10.

Furthermore, a plurality of sealing members 59 in the form of gaskets operate to form seals between one of the opposing surfaces 47, 49 of valve shuttle 44 and a respective one of plural bearing surfaces 51, 53 of bearing members 42, 43 in the illustrated embodiment.

A plurality of pressure sensors 48 are aligned with apertures 58 and configured to measure pressures of received air streams 46 during the measurement mode of operation. A plurality of apertures 60 are shown in FIG. 2A which provide apertures 58 of second bearing member 43 in fluid communication with respective pressure sensors 48.

Referring to FIGS. 3 and 3A, operations with respect to the service operational mode of apparatus 10 are discussed. As shown in FIG. 3A, the valve shuttle 44 has been moved from the first position shown in FIG. 2A (corresponding to the measurement operational mode), in a linear direction to the right with respect to inner support member 40, to a second position shown in FIG. 3A (corresponding to the service operational mode). As shown in FIGS. 3 and 3A, the air inlets 12 are not provided in fluid communication with pressure sensors 48 since the air passages 56 of valve shuttle 44 are not aligned with apertures 54, 58 of first and second bearing members 42, 43. The apertures 50 are not provided in fluid communication with the apertures 58 when the valve shuttle 44 is provided in the second position corresponding to the service mode of operation of apparatus 10. The inputs of the valve assembly may be considered to be isolated from the outputs of the valve assembly during the service mode of operation of apparatus 10.

In addition, a source of purge air (not shown) provides purge air 62 to purge inlet 14 and a source of calibration air (not shown) provides 64 calibration air to calibration inlet 66 during operation of the apparatus 10 in the service operational mode. Purge air 62 is pressurized air (e.g., 1-50 psi) and calibration air is pressurized air (e.g., 0-65 psi) in one embodiment. The purge air 62 is provided in fluid communication with the air inlets 12 and the calibration air 64 is provided in fluid communication with the pressure sensors 48 when the valve shuttle 44 is in the second position corresponding to the service mode of operation.

The applied purge air 62 flows through an aperture 63 within support member 40, an aperture in bearing member 42 (not shown), and fills one side of the valve shuttle 44 adjacent to surface 47. In the described example, the purge air 62 fills a volume defined by sealing member 59 and between surface 51 of bearing member 42 and surface 47 of valve shuttle 44 and which is external of the sealing members 57 (this described volume of purge air 62 is shown in vertical hatching in FIG. 3A). The purge air 62 flows from this volume through apertures 54, 50 and exits the air inlets 12, and which operates to purge the input air paths of foreign debris or matter.

The applied calibration air 64 flows through inlet 66 and an aperture 68 and fills one side of the valve shuttle adjacent to surface 49. In the described example, the calibration air 64 fills a volume defined by sealing member 59 and between surface 53 of bearing member 43 and surface 49 of valve shuttle 44 and which is external of the sealing members 57 (this described volume of calibration air 64 is shown in diagonal hatching in FIG. 3A). The calibration air 64 flows through apertures 58, 60 to pressure sensors 48. The calibration air 64 may have a known pressure which may be used to calibrate individual pressure sensors 48 in one embodiment. The apparatus 10 may be provided in the service operational mode at desired intervals between operations in the measurement mode of operation to permit purging and calibration and perhaps other operations or maintenance to be performed.

Figure 4:
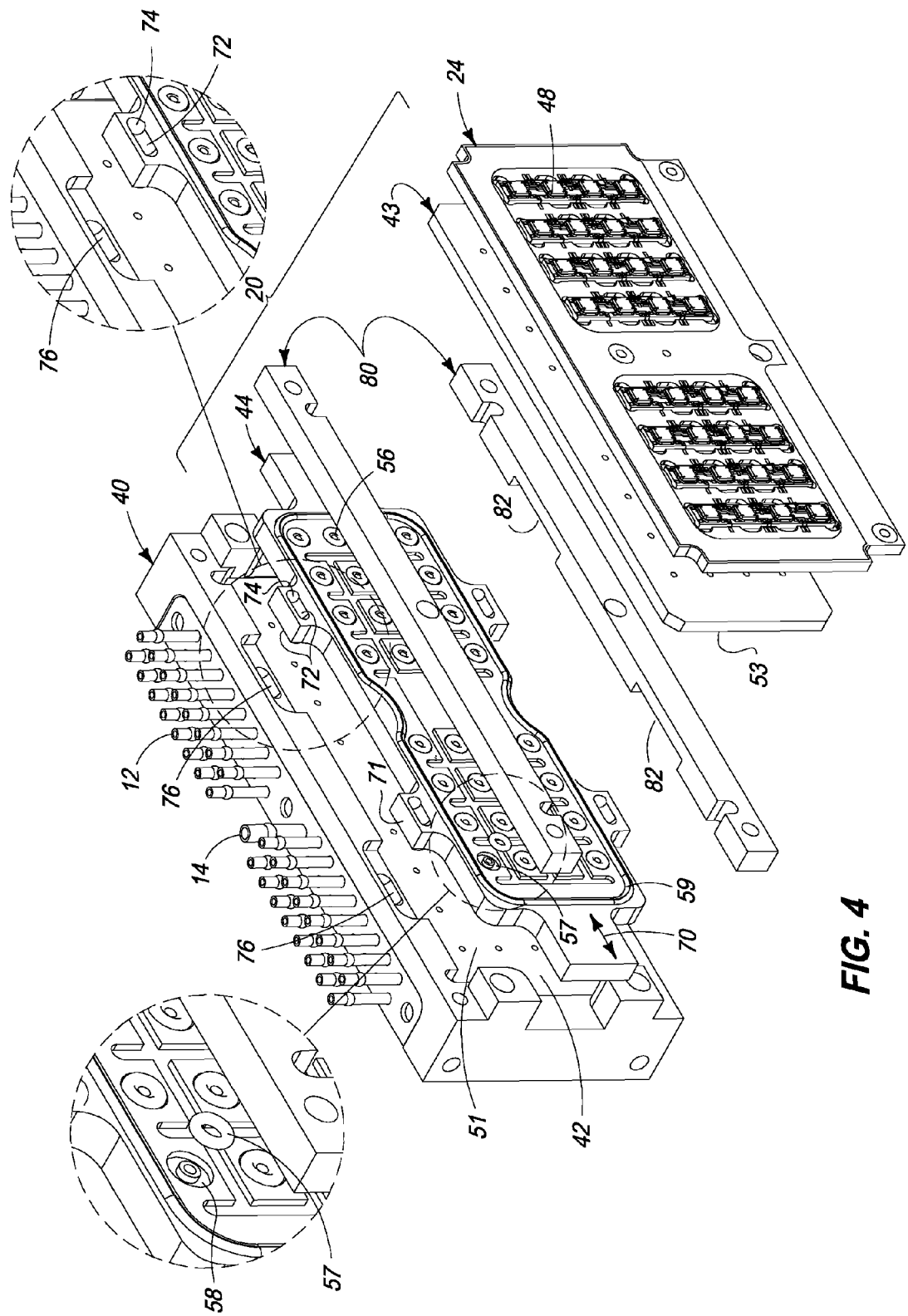
FIG. 4 is an exploded view of a sensor assembly and a valve assembly according to one embodiment.
Figure 5:
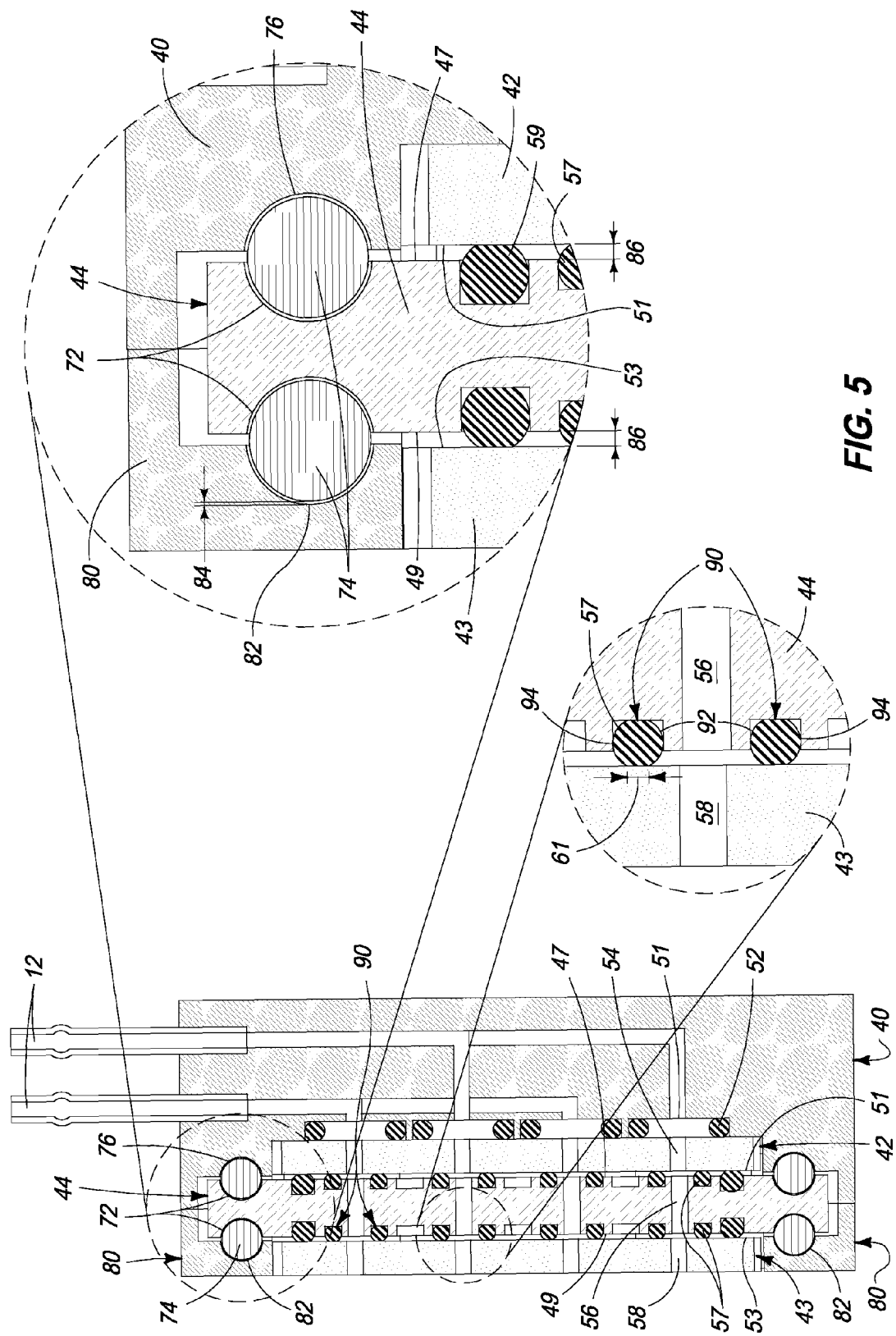
FIG. 5 is a cross-sectional view of a sensor assembly and a valve assembly according to one embodiment.

Referring to FIGS. 4 and 5, additional details of an example embodiment of apparatus 10 are shown. As mentioned above in one embodiment, the valve assembly 20 may be a shuttle/slider design where the valve shuttle 44 moves between first and second positions during the measurement and service modes of operation. The example embodiments of the valve assembly 20 described herein alleviate various problems associated with conventional slider valve designs.

In particular, some conventional sliding valves have experienced problems due to the friction of sliding O-rings across a fixed surface. This is exacerbated by inconsistent pressure being applied to the surface area of the shuttle when left in a single position for long periods of time. In addition, the forces on each sealing O-ring flattens the O-ring against the surface and these forces on the cross-sectional area of each O-ring seal is additive and must be overcome when the linear force is applied to actuate/slide the valve shuttle to another position.

Some of the embodiments discussed below alleviate these problems of conventional designs by including one or more features including a relatively short stroke between the different positions of the valve shuttle 44, controlling the distances between the surfaces 47, 49 of valve shuttle 44 and surfaces 51, 53 of the adjacent bearing members 42, 43, supporting the dynamic sealing members 57 during movement of the valve shuttle 44, and use of bearing members 42, 43 which have polymer surfaces 51, 53 which contact the dynamic sealing members 57.

In one embodiment, a relatively short stroke of the valve shuttle 44 is provided between plural positions for the measurement and service operational modes which helps reduce wear of dynamic sealing members 57 by reducing the amount of movement of the dynamic sealing members 57 against the bearing members 42, 43 compared to some conventional designs. In particular, at least substantially linear movement 70 of approximately 0.100" total travel of the valve shuttle 44 is provided between the first and second positions corresponding to the measurement and service modes of operation in one configuration of the valve assembly 20.

The illustrated valve shuttle 44 includes a plurality of extensions 71 which individually include ball bearing guides 72 adjacent opposing surfaces 47, 49 of the valve shuttle 44 and which receive ball bearings 74 (e.g., eight ball bearings 74 are provided with four on each side of the valve shuttle 44 in one embodiment).

Inner support member 40 also includes a plurality of ball bearing guides 76 which receive ball bearings 74. A plurality of outer support members 80 of the support assembly also include a plurality of ball bearing guides 82 which receive respective ball bearings 74. Guides 72, 76, 82 are elongated in the direction of linear movement 70 of the valve shuttle 44 in the illustrated embodiment and which restrict movement of the valve shuttle 44 to be at least substantially linear between the first and second positions. In particular, the outer support members 80 are attached to inner support member 40 using screws (not shown) and the guides 72, 76, 82 enclose the ball bearings 74 and which provide the at least substantially linear movement 70.

The use of ball bearings 74 in one embodiment controls distances between shuttle surfaces 47, 49 and bearing surfaces 51, 53. This limits the axial compression on the dynamic sealing members 57 (and prevents them from being forced flat under load) which reduces the sliding surface area of the sealing members 57 enabling precise linear (parallel) motion of the valve shuttle 44 with respect to the bearing members 42, 43 through its travel in a single linear direction between the different positions. This example configuration also reduces a tendency of the valve shuttle 44 to cock as actuation pressure is applied to the valve shuttle 44 and which ensures direct at least substantially linear movement 70 between the operative positions of the valve shuttle 44.

In one more specific embodiment, the ball bearings 74 are configured to limit axial compression of the sealing members 57 by spacing each of the opposing surfaces 47, 49 of valve shuttle 44 approximately 0.001" from respective opposing surfaces 51, 53 of bearing members 42, 43. In particular, the ball bearings 74 are stainless steel and have a diameter of 0.0625" and the clearance 84 between the ball bearings 74 and each ball bearing guide 72, 76, 82 is limited to 0.0005" which limits the play of valve shuttle 44 to 0.001" laterally in the illustrated example embodiment. In addition, a compression gap 86 of approximately 0.005" is provided between each surface 47, 49 of valve shuttle 44 and the respective opposing surface 51, 53 of bearing members 42, 43.

The control of the compression gap 86 (e.g., by use of ball bearings 74 in the illustrated example) limits the forces applied to the sealing members 57 and prevents the bearing members 57 from being flatten by compression and which results in extended life of sealing members 57. In addition, the control of the compression gap 86 reduces the wetted surface areas 61 of the sealing members 57 which contact the surfaces 51, 53 of bearing members 42, 43, and accordingly, reduced forces are needed to move the valve shuttle 44 between different operative positions.

In the illustrated example embodiment, a plurality of rectangular toroids 90 are provided within the opposing surfaces 47, 49 of valve shuttle 44. Toroids 90 may be formed by precision machining in one example. As described below, toroids 90 receive and support dynamic sealing members 57 during movement of the valve shuttle 44 between the first and second positions. The use of toroids 90 to receive and support the dynamic sealing members 57 reduces wear of the sealing members 57 resulting from movement of the valve shuttle 44.

More specifically, the described toroids 90 are configured in the describe embodiment to capture and support the inner and outer diameter surfaces 92, 94 of respective sealing members 57 during movement of the valve shuttle 44. The inner and outer diameter surfaces of the toroids 90 contact and apply force to inner and outer diameter surfaces 92, 94 of the sealing members 57 during movement of the valve shuttle 44 and which provides reduced wear of the sealing members 57, which may be O-rings in one embodiment.

In addition, the sealing members 57 may be relatively small diameter O-rings in one embodiment to reduce the volume which is exposed to an input air pressure within the interior of an individual O-ring and which improves frequency response compared with the use of a larger diameter O-ring having a larger interior volume.

In particular, in one implementation, the dynamic sealing members 57 are 65 durometer black self-lubricating HNBR O-rings having a thickness of 0.031," an outside diameter of 0.087" and an inside diameter of 0.043". O-rings and other sealing members that are captured and slid under compression without support of the inside diameter surfaces 92 resist the side-load frictional forces and may roll when the shuttle is moved which may cause excessive abrasion and the sealing members to wear quickly. The support of the inner and outer diameters of the sealing members 57 through the use of toroids 90 reduces the natural rolling tendency of the sealing members 57, and accordingly wear of the sealing member 57 is reduced when sliding upon a surface in a linear direction compared with arrangements which do not support inner diameters of the sealing members 57.

As discussed previously, it is desired to control the compression of the sealing members 57 to reduce the wetted area 61 of the sealing members 57. In one embodiment, the sizes of gaps 86 and the sizes of toroids 90 are configured to provide desired compression of dynamic sealing members 57. In one embodiment, toroids 90 have a depth of approximately 0.015" from the respective surfaces 47, 49, an outer diameter of approximately 0.093" and an inner diameter of approximately 0.043". The provision of gaps 86 of approximately 0.0005" compresses the above-described O-ring sealing members 57 having a thickness of 0.031" to approximately 0.026" in one embodiment.

In one embodiment, the bearing plates 42, 43 are formed of a polymer substrate which has a relatively low coefficient of friction, excellent machining properties, dimensional stability, low tendency to 'creep' over time, sufficient surface hardness, and the ability to achieve a smooth surface finish. In one specific embodiment, the polymer substrate has a static coefficient of friction of less than 0.1 and elongation less than 20%. The polymer substrate used for the bearing plates 42, 43 is Tecaform HPV13 in one example. The use of the polymer bearing members 42, 43 having polymer bearing surfaces 51, 53 reduces the side-sliding friction of the array of dynamic sealing members 57 under axial compression compared with other designs.

Figure 6:
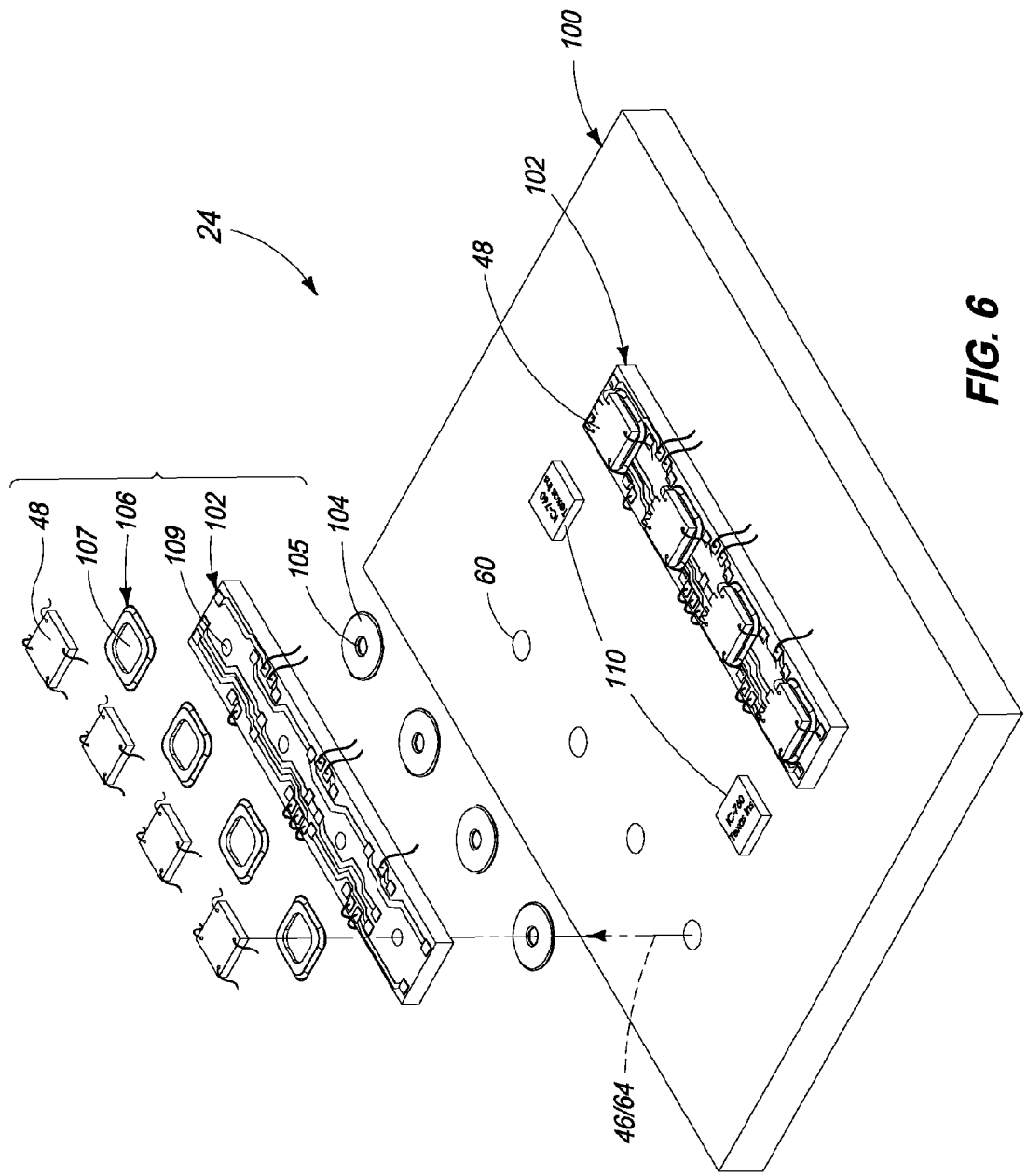
FIG. 6 is an exploded view of a sensor assembly according to one embodiment.

Referring to FIGS. 6 and 6A, one example embodiment of a sensor assembly 24 is shown. The example sensor assembly 24 includes a substrate 100 such as a base circuit board 100 (e.g., fiberglass FR4 in one example). The substrate 100 includes plural apertures 60 which are configured to pass respective air streams 46/64 between the opposing surfaces of the substrate 100. Substrate 100 has a thickness of approximately 0.063" in one embodiment.

In the illustrated embodiment, pressure sensors 48 are arranged in a plurality of groups upon respective sensor supports 102. Although only two groups of pressure sensors 48 are shown in FIG. 2, additional groups of pressure sensors 46 are typically provided and utilized to sense pressures of all sixty-four air inlets 12 of the example embodiments discussed herein. The sensor supports 102 may be ceramic and measure 0.100"×0.600"×0.025" in one implementation.

In one embodiment, the pressure sensors 48 are piezo silicon pressure transducers (e.g., AC7010 series available from Acuity Micro Sensors) and have a footprint of 0.063"× 0.063" square. These example pressure sensors 48 individually incorporate an internal pressure sensing element, such as a strain gauge bridge which is excited with a constant 2.5 volt supply. Other sensors may be used in other embodiments.

A plurality of first wire bonds 112 couple circuitry of pressure sensors 48 with circuitry of sensor supports 102 and second wire bonds 114 couple the circuitry of sensor supports 102 to base circuit board 100 in the illustrated example.

Pressures of air streams 46 (and calibration pressure 64) influence pressure sensitive surfaces 116 of the respective pressure sensors 48 which produce imbalances of the bridges of the sensors 48 resulting in the generation of millivolt analog output signals which are proportional to pressures of the air streams. Pressure ranges from 0.14 to 50 psi may be scanned by the pressure sensors 48 in the described embodiment. According to example aspects described below, an excitation technique may be utilized to reduce offset errors as a result of drift of the sensors over time.

Repeatability of pressure sensors 48 is important for characterizing and calibration of the sensors. Piezo silicon transducers are sensitive to mechanical loading which can be caused by temperature changes in external packaging as well as differences in the Coefficient of Thermal expansion of the substrate chosen to fix the sensor die.

In one embodiment, the sensor assemblies 24 provide double isolation of the pressure sensors 48 with respect to the substrate 100 to reduce mechanical stresses between substrate 100, sensor support 102 and/or pressure sensors 48, for example during the presence of temperature changes. In the illustrated embodiment, a plurality of first and second adhesive members 104, 106 are used to provide the double isolation and seal the air paths for air streams 46, 64 to the respective pressure sensors 48. First adhesive members 104 are adhered to substrate 100 and sensor support 102 and second adhesive members 106 are adhered to the sensor support 102 and pressure sensors 48. In other embodiments, only the first or second adhesive members 104, 106 are used with the pressure sensors 46.

In a more specific embodiment, four sensors 48 are adhered by second adhesive members 106 to sensor support 102 in the depicted embodiment. Pressure sensitive surfaces 116 (see FIG. 6A) of the pressure sensors 48 are aligned with apertures 107 of second adhesive members 106 and receive air streams 46 passing therethrough. Sensor supports 102 include apertures 109 which are aligned with apertures 107 of second adhesive members 106 and with apertures 105 of first adhesive members 104 as well as apertures 60 of substrate 100 and which provide sealed air paths for the respective air streams 46, 64 to the pressure sensors 48. First adhesive members 104 adhere sensor supports 102 to base circuit board 100 in the illustrated embodiment.

The ceramic sensor supports 102 are sufficiently rigid and have a Coefficient of Thermal Expansion which is similar to the silicon die of the pressure sensors 48 to reduce mechanical stresses induced between sensor support 102 and pressure sensor 48 during temperature changes.

An appropriate adhesive is used for first and second adhesive members 104, 106 for providing isolation between the sensors 48, sensor supports 102 and substrate 100. In one embodiment, adhesives are used which provide a strong bond (e.g., tensile strength>500 psi) and acceptable yield (e.g., durometer Shore A<50). The first and second adhesive members 104, 106 comprise 3145 RTV (Room Temperature Vulcanization) adhesive available from Dow Corning in one more specific embodiment. Other adhesive may be used in other embodiments.

The RTV adhesive of first and second adhesive members 104, 106 is cured with moisture in the atmosphere after its application in the sensor assembly 24 in one implementation. RTV adhesive is used in the described embodiment because it is compliant which reduces the mechanical stresses which occur naturally between the base circuit board 100 (e.g., fiberglass), silicon of the pressure sensors 48, and ceramic of the sensor supports 102 during temperature changes. The first and second adhesive members 104, 106 are rings which are approximately 0.005~0.008" thick in the illustrated embodiment.

The RTV adhesive cures as a relatively soft material and protects the sensors 48 from mechanical loading as the different materials of sensor 48, board 100, and member 102 expand and contract naturally at different rates as aforementioned. The layer of isolation provided by the second adhesive members 106 between the pressure sensors 48 and sensor support 102 additionally serves to pressure seal the sensor die of the pressure sensor 48 to the sensor support 102. The sensor supports 102 with the pressure sensors 48 adhered thereto are adhered to the base circuitry board 100 using the first adhesive members 104 which provide a second layer of mechanical isolation of the pressure sensors 48 and serve to pressure seal the sensor support 102 to the substrate 100 in the described embodiment.

The illustrated sensor assembly 24 also includes one or more temperature sensors 110 which are positioned and configured to monitor temperatures of the pressure sensors 48 in one embodiment. The temperature information may be used to convert digital values acquired from the pressure sensors 48 to appropriate engineering units in one embodiment. For example, each pressure sensor 48 may be characterized at different operational temperatures using a plurality of respective look-up-tables (LUTs) which are indexed by temperature and relate digital values outputted by the A/D converter of circuitry 130 to respective pressures in an appropriate engineering unit.

During operation for measuring pressures, the temperature of a given sensor 48 is obtained using output of temperature sensors 110. The operational temperature of the sensor 48 is used to select one of the LUTs which characterizes the given sensor 48 at the respective temperature. Thereafter, the selected LUT for the appropriate temperature provides a data value in an appropriate engineering unit which corresponds to a received digitized value from the A/D converter of circuitry 130 resulting from an air stream being measured by the given sensor 48.

In addition, in one embodiment, the pressure sensors 48 are sealed in an enclosed cavity 118 using an appropriate cover (e.g., see cover 162 of FIG. 11) and which is provided at a reference pressure and is isolated by the air streams 46, 64 by the first and second adhesive members 104, 106. In one embodiment, one side of a pressure sensing element of a pressure sensor 48 is exposed to the pressure of a respective air stream 46 while the other side of the pressure sensing element of the sensor 48 is exposed to the reference pressure.

In one embodiment, the maximum pressure difference between each of the pressures of input air streams 46 which are applied to the pressures sensors 48 and the reference pressure is 15 psi. Depending upon application, the reference pressure within cavity 118 may be ambient or static pressure (e.g., <15 psi) or some other controlled pressure which may be used.

Figure 7A:
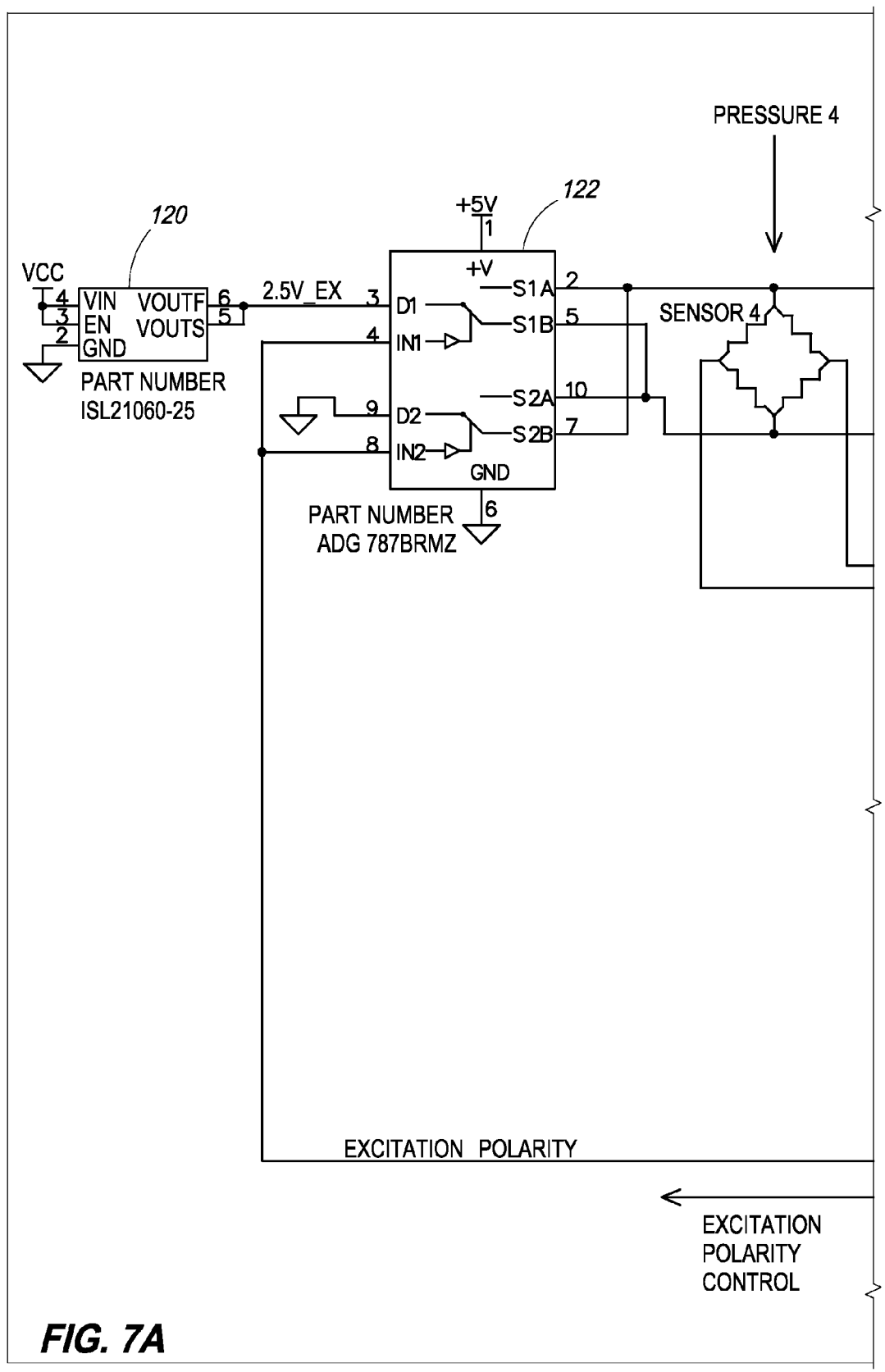
FIGS. 7A-7C are to be assembled. Once assembled.
Figure 7B:
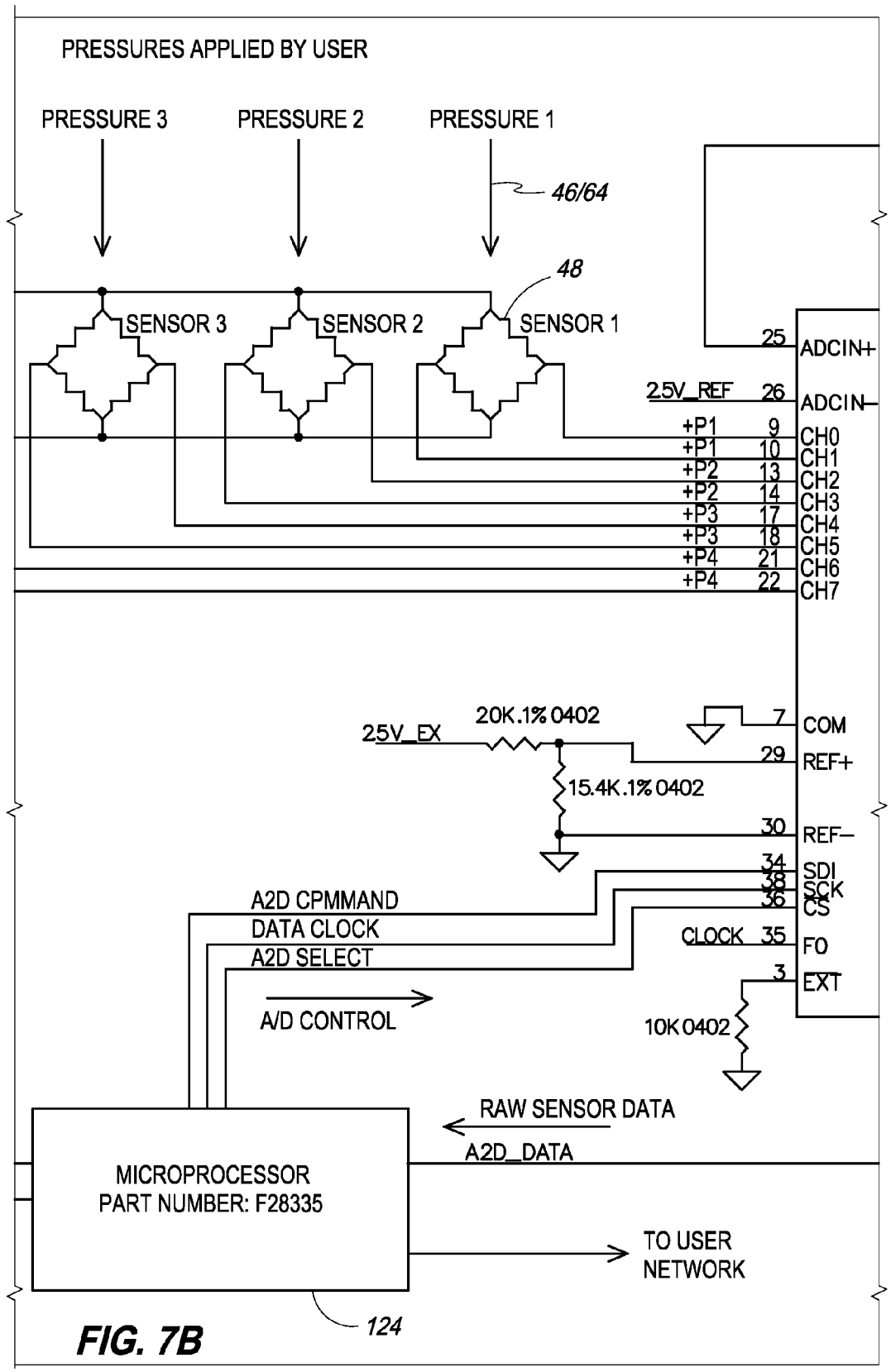
Figure 7C:
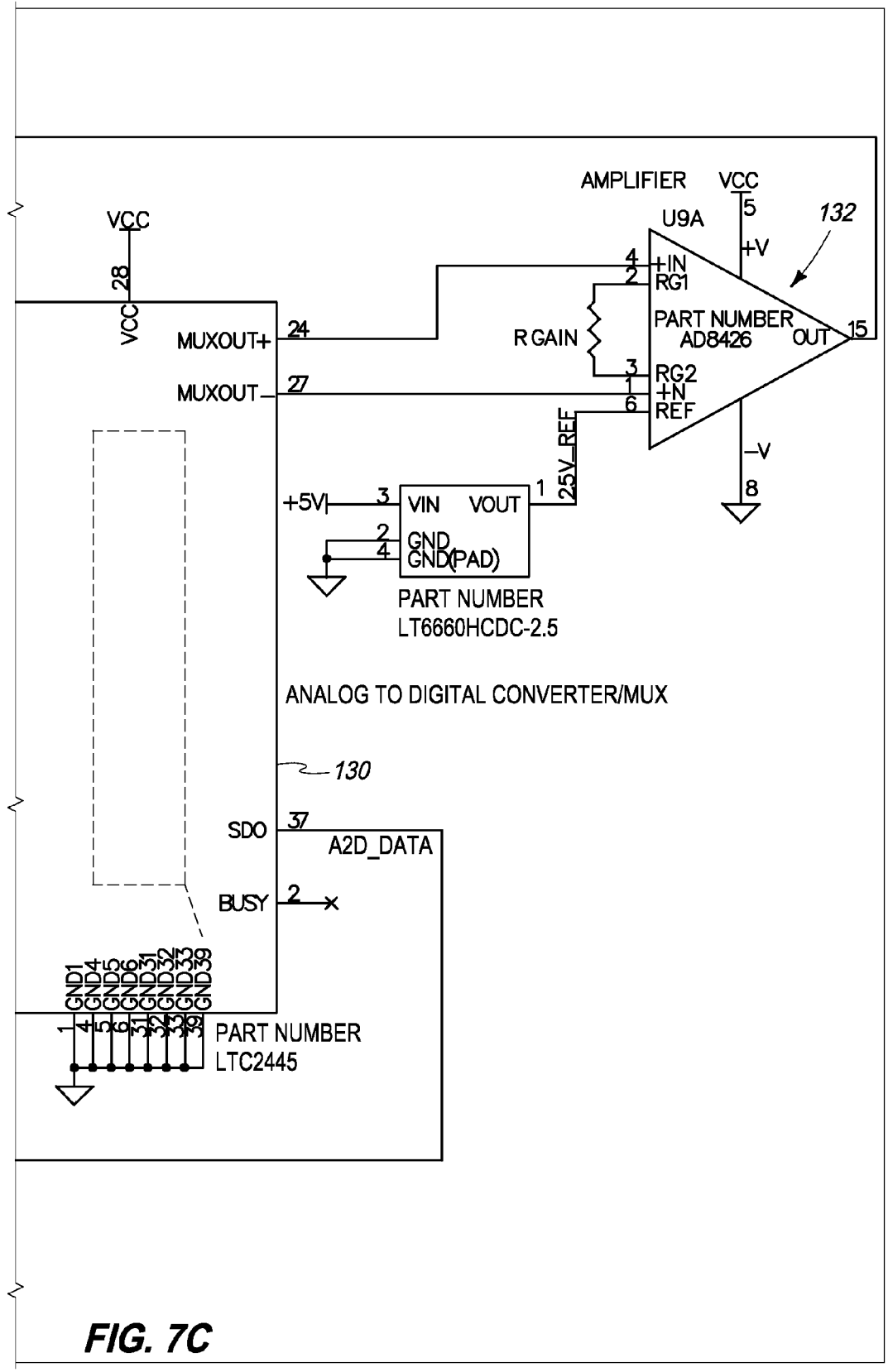

Referring to FIGS. 7A-C, circuitry of the pressure measurement apparatus 10 is shown according to one embodiment. Other configurations of circuitry may be used in other embodiments.

Four pressure sensors 48 of a single sensor support 102 are shown schematically in FIGS. 7A-7C. An excitation source 120 is configured to generate an excitation signal in the form of a reference voltage in the described embodiment which is applied to the pressure sensors 48 during measurement operations. In one embodiment, excitation source 120 is configured to generate the excitation signal in the form of a 2.5 VDC reference voltage in one embodiment. The individual pressure sensors 48 receive the excitation signal and produce an output analog voltage signal which is indicative of measured pressures and which varies in direct proportion to the changes in pressure applied to the individual pressure sensor 48 by a respective air stream 46, 64. The output of the apparatus 10 indicative of the measured pressure may be the analog voltage signal, which may be amplified, or a digital value which corresponds to the analog voltage signal in example embodiments.

In one embodiment, the generated excitation signal is applied to switching circuitry 122 which is configured to selectively reverse the polarity of the excitation signal and to apply the excitation signal having the different polarities at different moments in time to the pressure sensors 48 in parallel in the described embodiment. Switching circuitry 122 is configured to alternate the polarity of the excitation signal between different polarity states in one embodiment.

Processing circuitry in the form of a microprocessor 124 is configured to control operations of switching circuitry 122 to reverse the polarity of the excitation signal which is applied to the pressure sensors 48 at a plurality of moments in time to reduce drift of the pressure sensors 48 over time in one embodiment. One of the largest contributors to error within piezo silicon pressure sensors 48 is the inherent zero drift of the sensors 48 over temperature and time. The example described excitation technique switches the polarity of the 2.5 Volt excitation signal which is applied to the sensor bridges of the pressure sensors 48. In one more specific embodiment, the polarity of the excitation signal is switched between pressure readings. The output signal differences between the two analog values read from one of the pressure sensors 48 using the excitation signals of different polarities enables correction of amplifier offsets and parasitic thermocouple influence which reduces error. In addition, this example technique nulls or corrects non-ratio metric offsets of each of the pressure sensors 48 which also reduces error.

In one more specific embodiment, the software being executed by the microprocessor 124 controls the switching circuitry 122 (and polarity of the excitation signal) by writing a control word to register address 4202 hex in the address space of the microprocessor. Writing a 1 to bit 2 selects positive excitation while writing a 0 to bit 2 selects negative excitation in this example implementation.

Once the polarity of the excitation signal is selected and applied to the pressure sensors 48, the output of the pressure sensors 48 may be multiplexed and read using the A/D converter of A/D and multiplexing circuitry 130. Pressure sensors 48 are coupled via flexible circuits with circuitry 130 in one embodiment. The A/D converter of A/D and multiplexing circuitry 130 performs analog to digital conversion operations of the output voltages received from the respective pressure sensors 48 in the described embodiment.

In one embodiment, microprocessor 124 processes a plurality of digital values of a generated output signal from one of the pressure sensors 48 at a plurality of moments in time and corresponding to the different polarities of the excitation signal to determine an output value which is indicative of the pressure of an air stream received by the respective pressure sensor 48. In one more specific implementation, the two readings of the output signal (one positive and one negative corresponding to the different polarities of the excitation signal) are used to produce an output data value which is indicative of a pressure of the respective air stream 46 according to the following formula:

$$\text{Pressure Output Value} = (\text{A/D value acquired during positive excitation} - \text{A/D value acquired during negative excitation})/2$$

In one embodiment, the excitation signal which is applied to pressure sensors 46 is continuously toggled between positive and negative excitation during the data acquisition process to reduce zero drift over temperature and time.

The analog voltage signals received from the pressure sensors 48 are multiplexed using multiplexer circuitry of the circuitry 130 and amplified using amplification circuitry 132 prior to conversion to digital values by the A/D converter of circuitry 130 in one embodiment. The A/D converter of circuitry 130 provides 24 bit conversion in one example.

The output of the A/D conversion is communicated to microprocessor 124 for processing. In the described embodiment, microprocessor 124 controls the polarity of the excitation signal and processes the received digital values discussed above as well as performs desired engineering unit conversion tasks of the corrected data (e.g., provide the data values as psi readings). In one more specific embodiment, microprocessor 124 correlates the digital values to a previously generated calibration table which provides conversion of the data to a desired engineering unit. Other engineering units may be provided by multiplying scalar conversion factors to the default units. The data values which are indicative of the sensed pressures may be output to a user network, for example, via Ethernet in one embodiment.

Figure 8:
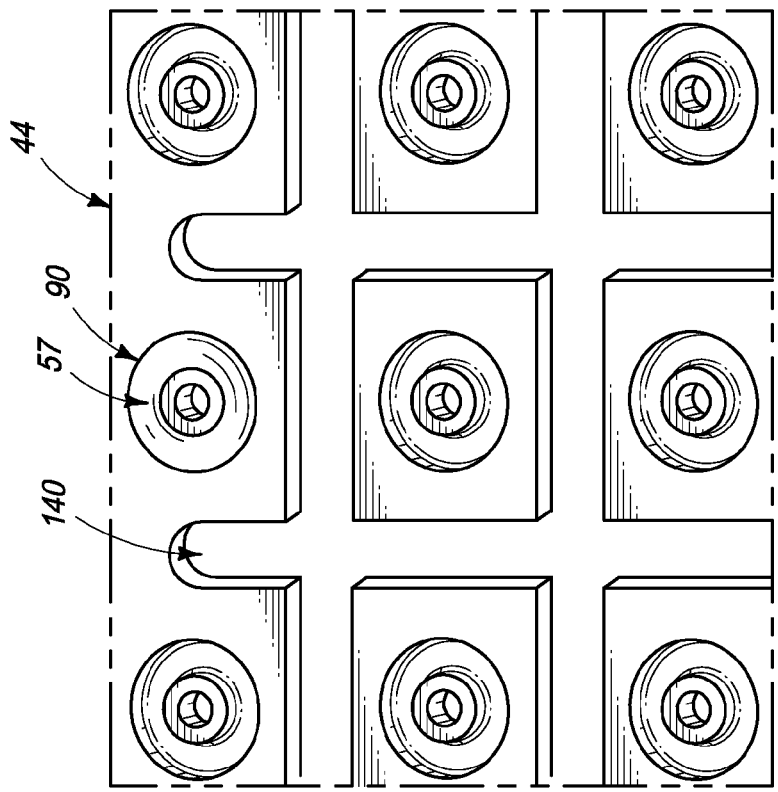
FIG. 8 is an isometric view of a surface of a valve shuttle according to one embodiment.

Referring to FIG. 8, a portion of one of the surfaces 47, 49 of valve shuttle 44 is shown according to one embodiment. The opposite one of the surfaces 47, 49 which is not shown may have the same configuration. A plurality of toroids 90 are shown in the surface of the valve shuttle 44 and which receive respective sealing members 57 in the form of O-rings in the illustrated embodiment.

The depicted surface of the valve shuttle 44 also includes a plurality of channels 140 of a manifold. More specifically, if the channels 140 are within surface 47 of valve shuttle 44, they are part of a purge manifold which directs purge air from a purge source to the air inlets 12, while if the channels 140 are within surface 49 of valve shuttle 44, they are part of a calibration manifold which is isolated from the purge manifold and directs calibration air from a calibration source to pressure sensors 48. During the service mode of operation, the channels 140 are in fluid communication with apertures 54 or apertures 60 while the channels 140 are isolated from apertures 54 or apertures 60 during the measurement mode of operation. In one embodiment, toroids 90 and channels 140 are formed by precision machining of the surfaces 47, 49 of the valve shuttle 44 which is aluminum in one embodiment.

Figure 9:
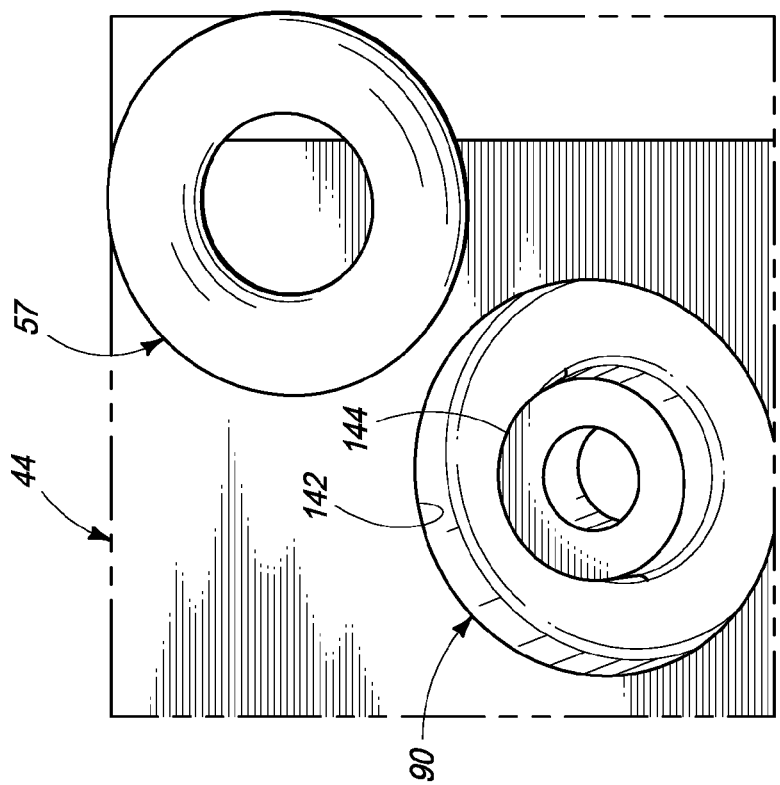
FIG. 9 is an isometric view of a toroid and dynamic sealing member according to one embodiment.

Referring to FIG. 9, additional details of one of the toroids 90 of the valve shuttle 44 and an associated sealing member 57 are shown in one implementation. As mentioned above in one embodiment, toroids 90 individually have a depth of approximately 0.015" from the respective surface, an outer diameter 142 of approximately 0.093" and an inner diameter 144 of approximately 0.043" for use with sealing members 57 in the form of O-rings 57 in the example embodiment. The toroids 90 support inner and outer surfaces of sealing members 57 (e.g., having a thickness of 0.031," an outside diameter of 0.087" and an inside diameter of 0.043" in one specific implementation) during movement of the valve shuttle 44 between first and second operative positions and which reduces a tendency of the sealing members 57 to roll during movement of the valve shuttle 44.

Figure 10:
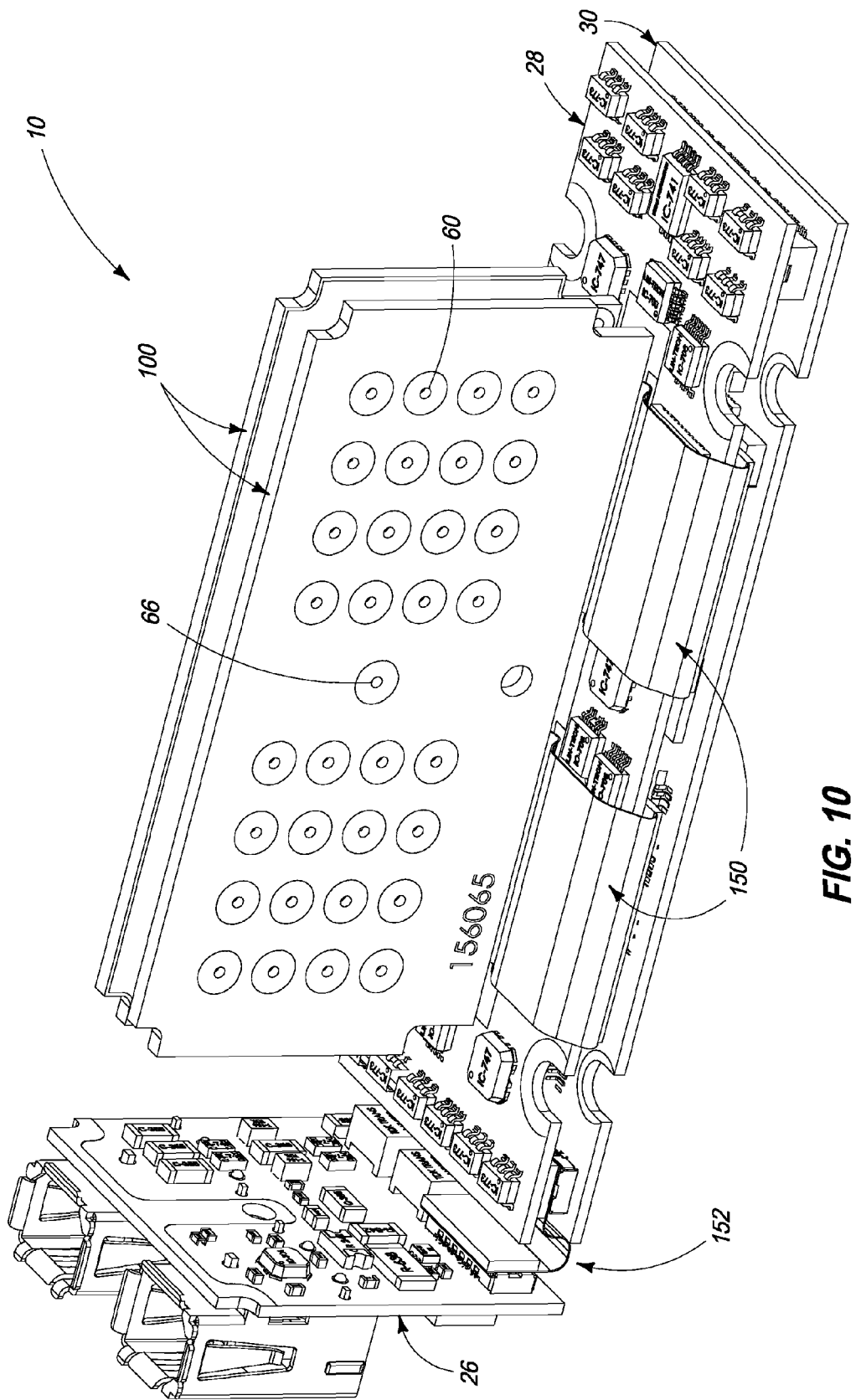
FIG. 10 is an isometric view of components of a pressure measurement apparatus according to one embodiment.

Referring to FIG. 10, additional details of an example configuration of pressure measurement apparatus 10 are shown. The illustrated portions of the apparatus 10 include power and communications circuitry 26, analog-to-digital (A/D) circuitry 28 (e.g., circuitry 130), processing circuitry 30 (e.g., microprocessor 124, and plural substrates 100 of plural sensor assemblies 24. In addition, plural flexible circuits 150 electrically couple processing circuitry 30 with the pressure sensors of respective ones of the sensor assemblies and flexible circuit 152 electrically couples the power and communications circuitry 26 with the A/D circuitry 28 and processing circuitry 30.

Figure 11:
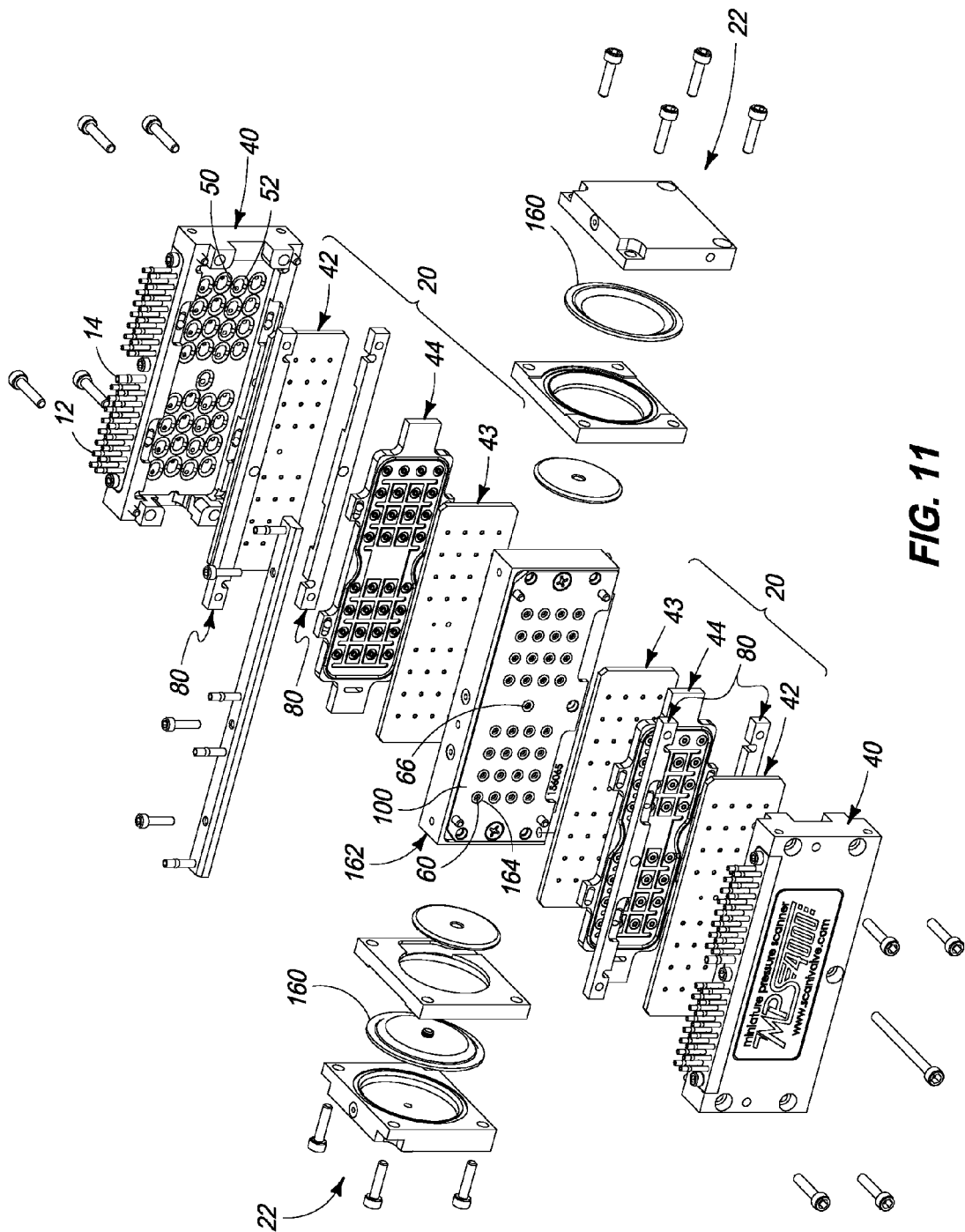
FIG. 11 is an exploded isometric view of components of a pressure measurement apparatus according to one embodiment.

Referring to FIG. 11, an exploded view of an example configuration of plural valve assemblies 20 of pressure measurement apparatus 10 is shown. In the illustrated arrangement, the valve assemblies 20 are adjacent to one another and may be activated by one of the actuators 22 which individually include a flexible diaphragm 160. Plural sensor assemblies 24 are within a cover 162 which provides the enclosed cavity 118 about the pressure sensors 48 (see FIG. 6A). A plurality of outer support members 80 define the ball bearing guides of each of the valve assemblies 20 in the arrangement of FIG. 11. A plurality of static sealing members 164 in the form of O-rings are provided about apertures 60, 66 in the illustrated embodiment.

Figure 12:
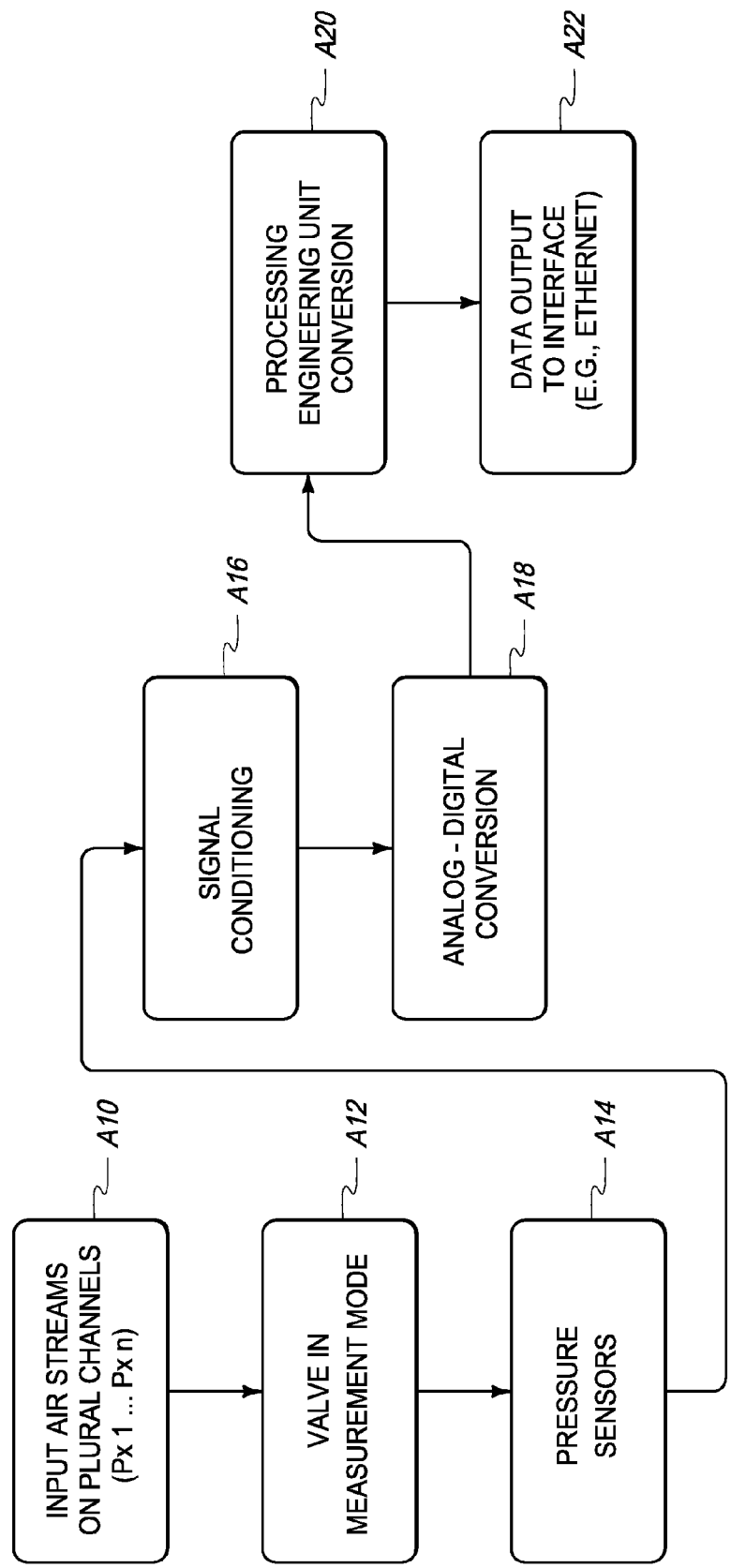
FIG. 12 is a flow diagram of operations performed by an intelligent version of a pressure measurement apparatus according to one embodiment.

Referring to FIG. 12, a flow diagram of pressure measurement operations performed by an intelligent version of the pressure measurement apparatus 10 is shown according to one embodiment. Other acts are possible including more, less and/or alternative acts.

Initially, at an act A10, a plurality of input air streams are received via the air inlets corresponding to a plurality of input channels of the pressure measurement apparatus.

The valve assembly is configured to provide the apparatus in the measurement mode of operation in act A12 where the air streams are directed to the pressure sensors.

At an act A14, the pressure sensors receive and measure the pressures of the air streams at a plurality of moments in time. The pressure sensors output a plurality of analog voltage signals which vary according to variances in the pressures of the respective air streams.

At an act A16, the analog voltage signals are conditioned by circuitry 130, 132 which includes multiplexing and amplification of the received voltage signals in one embodiment.

At an act A18, a plurality of digital values are generated at a plurality of moments in time for each of the analog voltage signals by circuitry 130. The digital values may be generated using an excitation signal of different polarities at different moments in time in one embodiment.

At an act A20, the digital values are converted to engineering units (e.g., PSI) which are indicative of the pressures of the respective air streams.

At an act A22, the converted data is outputted externally of the pressure measurement apparatus for analysis of the pressures of the air steams or other uses.

Figure 13:
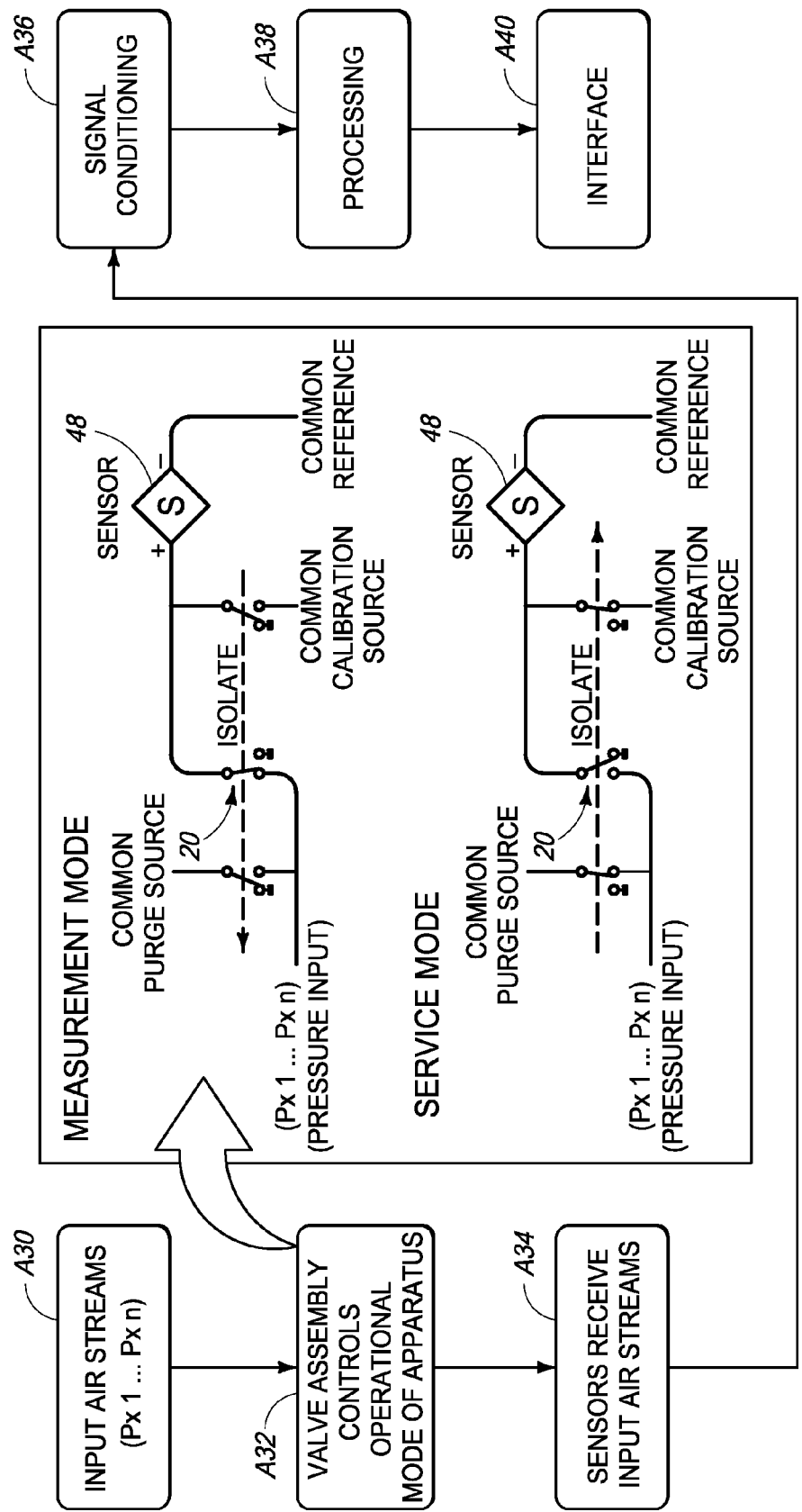
FIG. 13 is a flow diagram of operations performed by an intelligent version of a pressure measurement apparatus according to one embodiment.

Referring to FIG. 13, another flow diagram of pressure measurement operations performed by an intelligent version of the pressure measurement apparatus is shown. Other acts are possible including more, less and/or alternative acts.

A plurality of input air streams are received via the air inlets at an act A30.

At an act A32, the valve shuttle is actuated between plural positions to control operation of the pressure measurement apparatus in the measurement and service modes of operation. In one embodiment, pneumatic, electric or spring force is used to provide the valve shuttle in the different positions corresponding to the different operational modes. During the measurement mode of operation, the valve assembly 20 operates to provide the input air streams in fluid communication with the pressure sensors while isolating sources of purge air and calibration air. During the service mode of operation, the valve assembly 20 operates to isolate the air inlets from the pressure sensors while providing purge air from a purge source to the air inlets and providing calibration air from a calibration source to the pressure sensors. The purging is implemented by applying the purge air of a common pressure to the air inlets to clear the air inlets while isolating and protecting the pressure sensors from the purge air. Furthermore, calibration and validation is performed by applying calibration air of a common pressure to the pressure sensors which are isolated from the air inlets.

At an act A34, the pressure sensors receive the air streams. As mentioned above, the polarity of the excitation signals which are applied to the pressure sensors may be alternated for offset/drift correction in one embodiment.

At an act A36, the output analog signals of the pressure sensors are conditioned including multiplexed and amplified, and subsequently converted to digital values.

At an act A38, the digital values are converted to data in the form of engineering units which are indicative of the measured pressures.

At an act A40, an interface (e.g., Ethernet) outputs the data for customer use.

Figure 14:
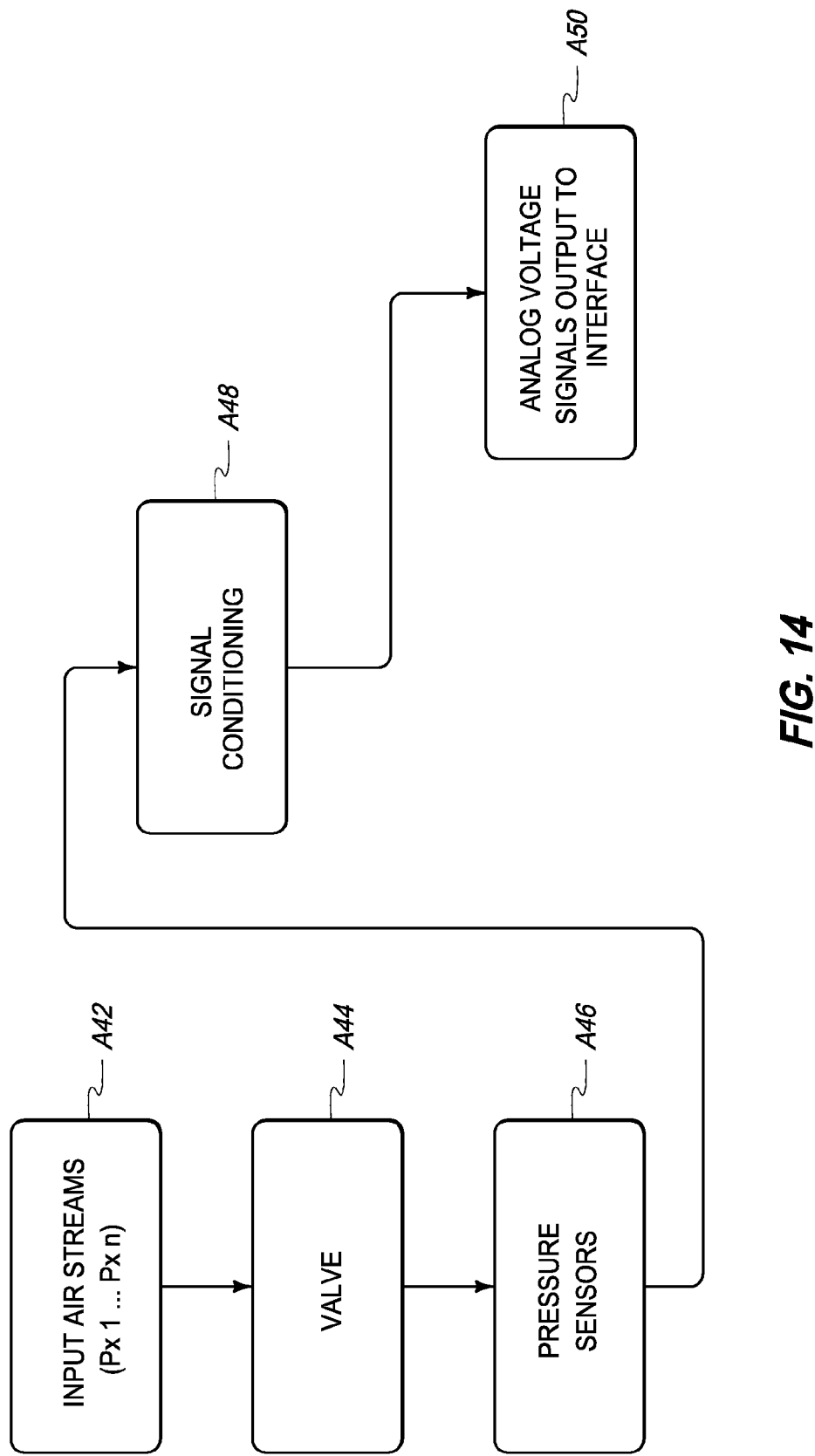
FIG. 14 is a flow diagram of operations performed by an analog version of a pressure measurement apparatus according to one embodiment.

Referring to FIG. 14, a flow diagram of pressure measurement operations performed by an analog version of the pressure measurement apparatus is shown. Other acts are possible including more, less and/or alternative acts.

Initially, at an act A42, a plurality of input air streams are received via the air inlets corresponding to a plurality of input channels of the pressure measurement apparatus.

At an act A44, the valve assembly is configured to provide the apparatus in the measurement mode of operation to direct the air streams to the pressure sensors.

At an act A46, the pressure sensors receive and measure the pressures of the air streams at a plurality of moments in time. The pressure sensors output a plurality of analog voltage signals which vary according to variances in the pressures of the respective air streams.

At an act A48, the analog voltage signals are conditioned (e.g., multiplexed and amplified in one embodiment).

At an act A50, the analog voltage signals (e.g., high level 3.5 V signals) are outputted externally of the pressure measurement apparatus, for example, for data acquisition.

Figure 15:
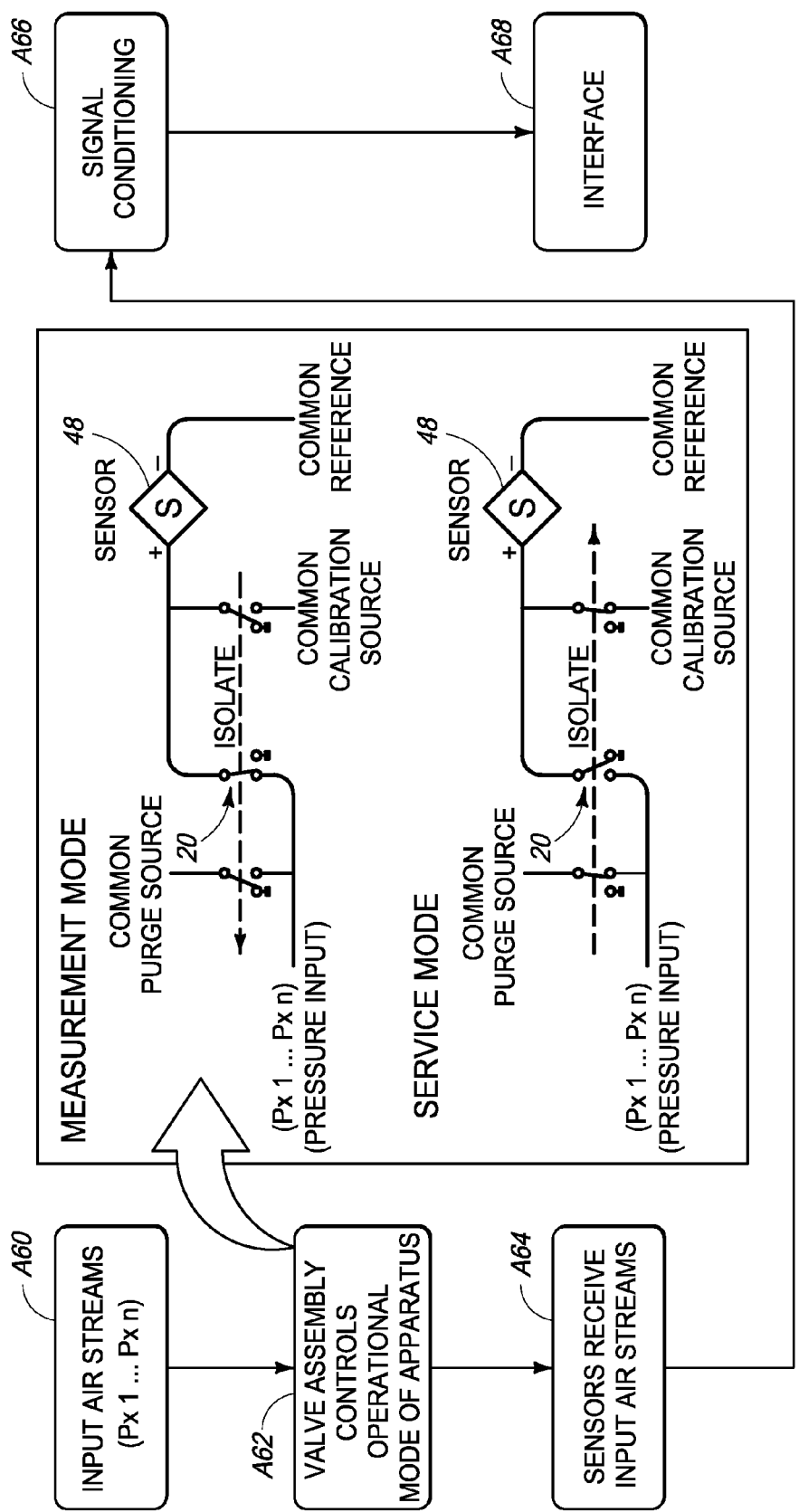
FIG. 15 is a flow diagram of operations performed by an analog version of a pressure measurement apparatus according to one embodiment.

Referring to FIG. 15, another flow diagram of pressure measurement operations performed by an analog version of the pressure measurement apparatus is shown. Other acts are possible including more, less and/or alternative acts.

A plurality of input air streams are received via the air inlets at an act A60.

At an act A62, the valve shuttle is actuated between plural positions to control operation of the pressure measurement apparatus in the measurement and service modes of operation as described above with respect to act A62 of FIG. 13 in one embodiment.

At an act A64, the pressure sensors receive the air streams and the polarity of the excitation signals which are applied to the pressure sensors may be alternated for offset correction in one embodiment.

At an act A66, the output analog signals of the pressure sensors are multiplexed and amplified.

At an act A68, an interface outputs the amplified analog voltage signals externally of the apparatus for use.

Referring to FIGS. 16A-16D, additional details of one embodiment of the pressure measurement apparatus are described.

Figure 16A:
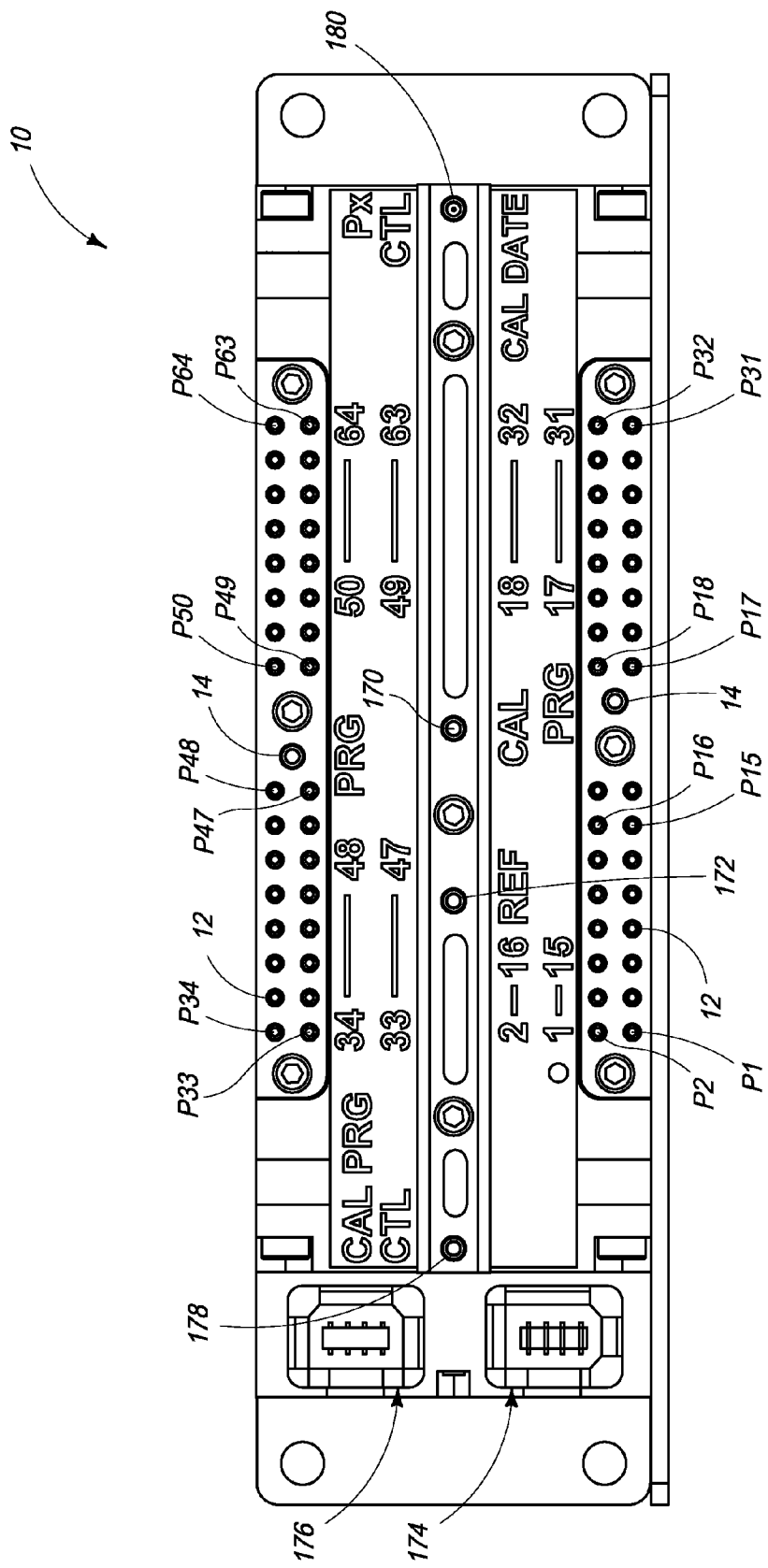
FIG. 16A is a top view of one embodiment of a pressure measurement apparatus.

A top view of an assembled pressure measurement apparatus 10 is shown in FIG. 16A. The depicted apparatus 10 has 64 channels/air inlets 12 which receive the input air streams. A calibration pressure input 170 is in fluid communication with the source of calibration air and the calibration manifold, a reference pressure input 172 is in fluid communication with a reference source (e.g., ambient or other reference pressure) and cavity 118 (e.g., without the use of valving between input 172 and cavity 118 in one embodiment), a calibration control pressure input 178 is coupled with a source of pressurized air (e.g., 30-100 psi) which moves the valve shuttle 44 to the position shown in FIG. 3A during the service mode of operation, and a measurement control pressure input 180 is coupled with a source of pressurized air (e.g., 30-100 psi) which moves the valve shuttle 44 to the position shown in FIG. 2A during the measurement mode of operation.

A first interface 174 receives operational power (e.g., 9-36 VDC), provides a serial connection (e.g., for coupling with a personal computer for manual configuration), and receives a trigger signal for data synchronization in one embodiment. A second interface 176 outputs digital data or analog voltage signals which are indicative of the measured pressures of the air streams.

Figure 16B:
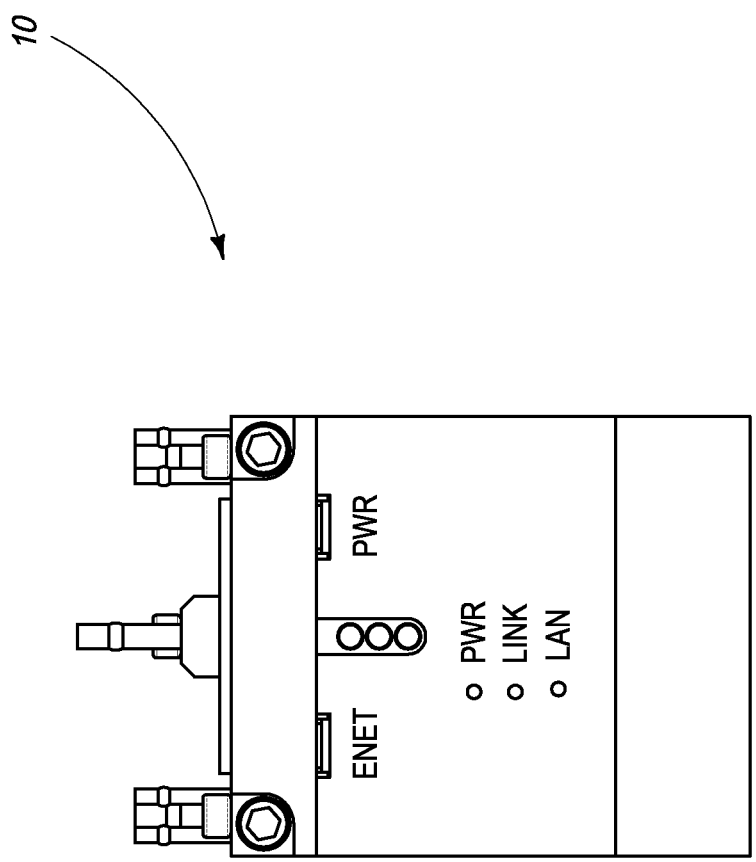
FIG. 16B is a side view of one embodiment of a pressure measurement apparatus.

Referring to FIG. 16B, an end view of the apparatus 10 is shown including a plurality of indicators 182 for indicating operational status of apparatus 10 including power, link (e.g., whether an Internet connection has been made), and LAN connectivity in the example embodiment.

Figure 16C:
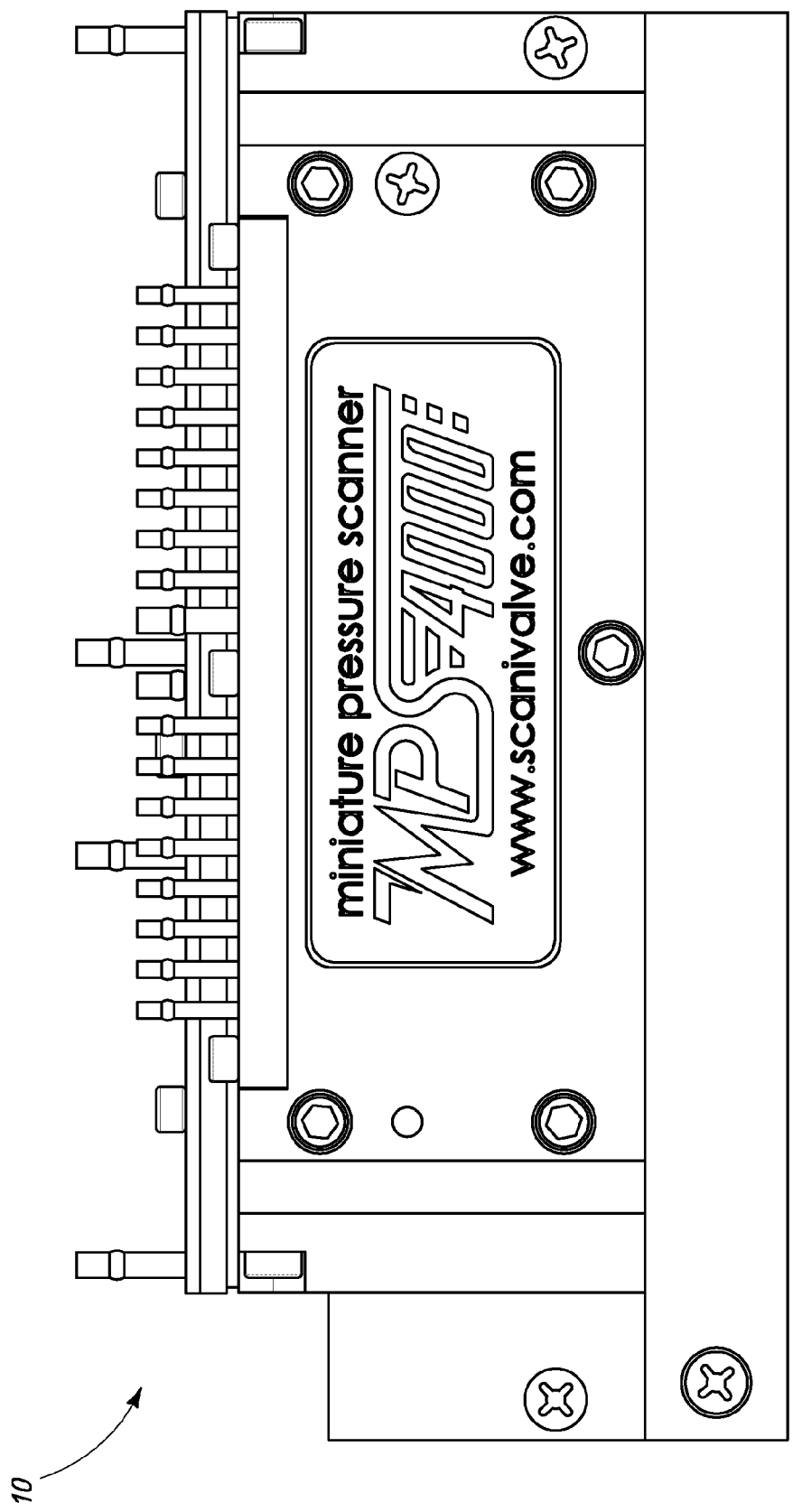
FIG. 16C is a front view of one embodiment of a pressure measurement apparatus.

Referring to FIG. 16C, a side view of the apparatus 10 is shown.

Figure 16D:
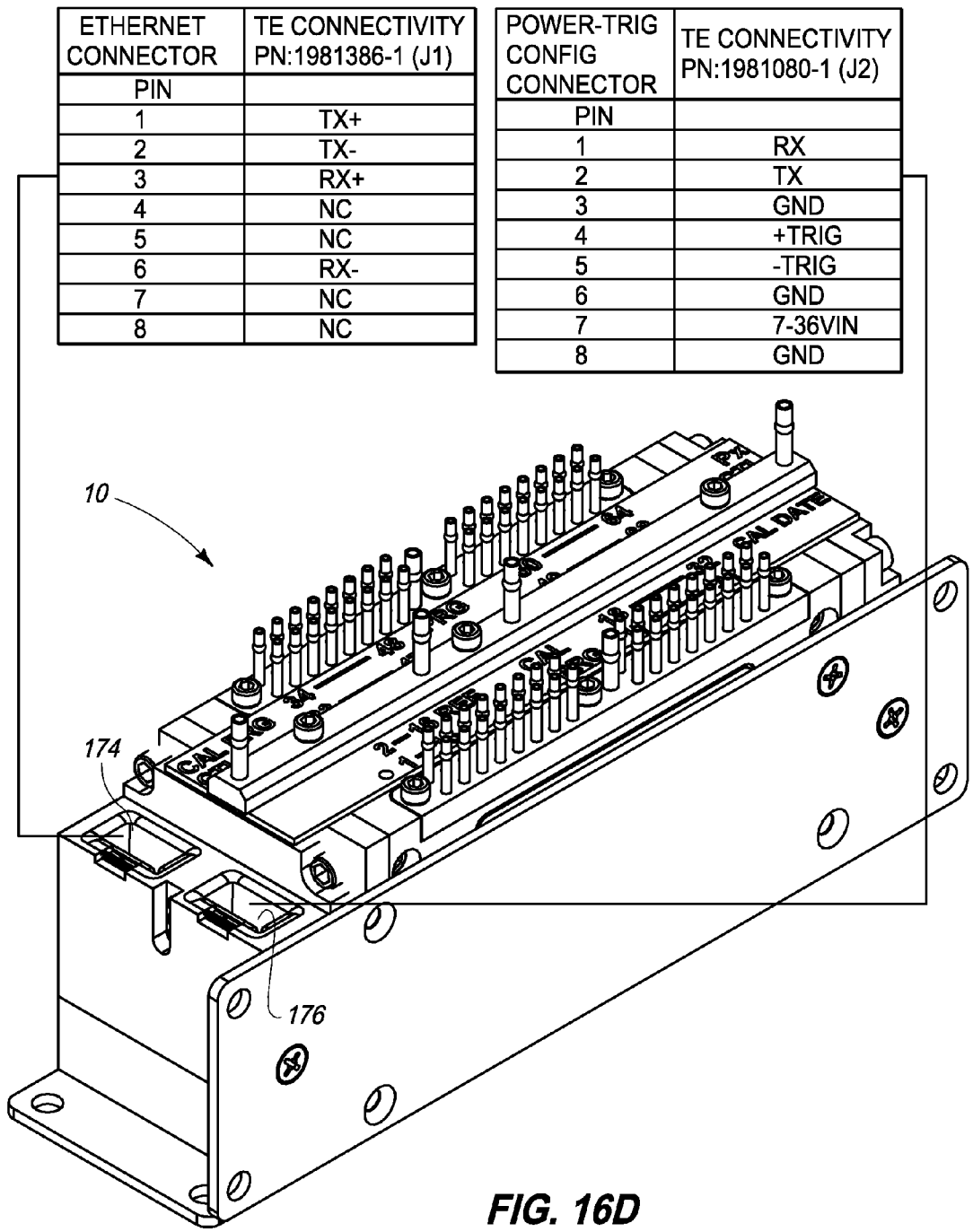
FIG. 16D is an isometric view of one embodiment of a pressure measurement apparatus.

Referring to FIG. 16D, pins of one configuration of first and second interfaces 174, 176 are shown.

Referring to FIGS. 17A-17B, example operations of valve assembly 20 corresponding to the service and measurement modes of operation are shown in a schematic representation.

FIG. 17A illustrates the service operational mode where the valve assembly 20 isolates the air inlets from the pressure sensors and applies purge air to the air inlets and calibration air to the pressure sensors.

FIG. 17B illustrates the measurement operational mode where the valve assembly provides the air inlets in fluid communication with respective ones of the pressure sensors which measure the pressures of the air streams while the sources of purge air and calibration air are isolated form the air inlets and the pressure sensors.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A pressure measurement apparatus comprising:
    a plurality of air inlets configured to receive respective ones of a plurality of different air streams;
    a valve assembly configured to switch operation of the pressure measurement apparatus between a measurement mode of operation and a service mode of operation, the valve assembly comprising:
        a plurality of inputs coupled with respective ones of the air inlets and configured to receive respective ones of the air streams;
        a plurality of outputs;

a valve shuttle comprising a plurality of air passages, wherein the valve shuttle is configured to move between a first position corresponding to the measurement mode of operation and a second position corresponding to the service mode of operation;

wherein the air passages provide the inputs of the valve assembly in fluid communication with respective ones of the outputs of the valve assembly when the valve shuttle is in the first position;

wherein the inputs of the valve assembly are isolated from the respective ones of the outputs of the valve assembly when the valve shuttle is in the second position; and wherein the valve shuttle comprises a plurality of toroids about the inputs and the outputs of the valve assembly and individually configured to receive a sealing member which forms a seal about a respective one of the inputs and the outputs of the valve assembly; and a plurality of pressure sensors coupled with respective ones of the outputs of the valve assembly, wherein the pressure sensors are configured to measure pressures of respective ones of the air streams.

2. The apparatus of claim 1 wherein a source of purge air is provided in fluid communication with the air inlets when the valve shuttle is in the second position.

3. The apparatus of claim 1 wherein a source of calibration air is provided in fluid communication with the pressure sensors when the valve shuttle is in the second position.

4. The apparatus of claim 1 wherein the valve assembly comprises a plurality of bearing members comprising bearing surfaces adjacent to opposing surfaces of the valve shuttle, and the sealing members are individually received between one of the bearing surfaces and one of the surfaces of the valve shuttle.

5. The apparatus of claim 4 wherein the bearing members are polymer members.

6. The apparatus of claim 1 wherein the sealing members are O-rings, and the toroids individually support an inner diameter surface and an outer diameter surface of one of the toroids.

7. The apparatus of claim 1 wherein the valve shuttle comprises a plurality of ball bearing guides, and further comprising:

a support member adjacent to the valve shuttle, wherein the support member comprises a plurality of ball bearing guides; and a plurality of ball bearings received within the ball bearing guides of the valve shuttle and the support member, and wherein the ball bearings are configured to limit axial compression of the sealing members received within the toroids of the valve shuttle.

8. The apparatus of claim 7 wherein the ball bearing guides are configured to provide at least substantially linear movement of the valve shuttle during movement between the first position and the second position.

9. The apparatus of claim 7 wherein ball bearings control a distance between a surface of the valve shuttle and a surface of a bearing member adjacent to the surface of the valve shuttle.

10. The apparatus of claim 1 further comprising a pressure sensor assembly which comprises:

a substrate comprising apertures configured to pass air streams through the substrate for each of the pressure sensors;

first adhesive members adhered to the substrate which individually comprise an aperture aligned with one of the apertures of the substrate and which is configured to pass one of the air streams through the individual first adhesive member;

sensor supports adhered to respective ones of the first adhesive members and individually comprising an aperture aligned with the aperature of one of the first adhesive members and which is configured to pass one of the air streams through the individual sensor support;

second adhesive members adhered to respective ones of the sensor supports and individually comprising an aperture aligned with the aperature of one of the sensor supports and which is configured to pass one of the air streams through the individual second adhesive member; and wherein each of the pressure sensors is adhered to one of the second adhesive members, aligned with the respective aperture of the one of the second adhesive members, and configured to vary an output signal as a result of changes in pressure of the air stream which passes through the aperture of the one of the second adhesive members, wherein the output signal is indicative of the changes in pressure of the air stream.

11. The apparatus of claim 10 wherein each of the pressure sensors comprises a pressure sensitive surface aligned with the respective aperture of the one of the second adhesive members.

12. The apparatus of claim 10 wherein each of the first and second adhesive members comprises Room Temperature Vulcanization adhesive and the sensor support comprises a ceramic.

13. The apparatus of claim 10 wherein each of the first and second adhesive members is configured to reduce mechanical stresses which occur between the substrate, a respective one of the sensor supports, and a respective one of the pressure sensors.

14. A pressure measurement apparatus comprising:

a plurality of air inlets configured to receive respective ones of a plurality of different air streams;

a valve assembly comprising:

a plurality of inputs coupled with respective ones of the air inlets and configured to receive respective ones of the air streams;

a plurality of outputs; and a valve shuttle configured to selectively provide the air streams received via the inputs of the valve assembly to respective ones of the outputs of the valve assembly;

a plurality of pressure sensors configured to receive the air streams from respective ones of the outputs of the valve assembly, and wherein the pressure sensors individually comprise a pressure sensing element configured to:

receive a respective one of the air streams and an excitation signal; and generate an output signal which is indicative of pressures of the one air stream at a plurality of moments in time as a result of excitation by the excitation signal; and circuitry configured to generate and change the polarity of the excitation signals which are applied to the pressure sensing elements at a plurality of moments in time during the generation of the output signals which are indicative of the pressures of respective ones of the air streams.

15. The apparatus of claim 14 wherein the circuitry is configured to process a plurality of values of the output signal, obtained at different moments in time which correspond to the excitation signal having different polarities, to determine an output value which is indicative of the pressure of the air stream.

16. The apparatus of claim 15 wherein the circuitry is configured to determine the output value according to the formula:

output value=(first value of output signal acquired during positive excitation−second value of output signal acquired during negative excitation)/2.

17. The apparatus of claim 14 wherein the circuitry is configured to process first and second values of the output signal which are generated resulting from the excitation signal having different polarities at different moments in time to provide an output value which is indicative of the pressure of the air stream.

18. The apparatus of claim 14 wherein the circuitry is configured to change the polarity of the excitation signals to reduce zero drift of the pressure sensors.

19. The apparatus of claim 14 wherein the circuitry is configured to change the polarity of one of the excitation signals comprising alternating the polarity of the one excitation signals between different polarity states at a plurality of moments in time.

20. The apparatus of claim 14 wherein the pressure sensors are piezo transducers which individually comprise a strain gauge bridge which receives one of the airstreams.

* * * * *